United States Patent
Oehring et al.

(10) Patent No.: US 11,449,018 B2
(45) Date of Patent: Sep. 20, 2022

(54) SYSTEM AND METHOD FOR PARALLEL POWER AND BLACKOUT PROTECTION FOR ELECTRIC POWERED HYDRAULIC FRACTURING

(71) Applicant: US WELL SERVICES LLC, Houston, TX (US)

(72) Inventors: Jared Oehring, Houston, TX (US); Robert Kurtz, Houston, TX (US); Brennan Zaunbrecher, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 14/881,535

(22) Filed: Oct. 13, 2015

(65) Prior Publication Data

US 2016/0105022 A1      Apr. 14, 2016

Related U.S. Application Data

(60) Provisional application No. 62/063,680, filed on Oct. 14, 2014.

(51) Int. Cl.
  *G05B 15/02*   (2006.01)
  *E21B 43/26*   (2006.01)
  (Continued)

(52) U.S. Cl.
  CPC .............. *G05B 15/02* (2013.01); *E21B 43/26* (2013.01); *H02J 3/14* (2013.01); *H02J 9/066* (2013.01);
  (Continued)

(58) Field of Classification Search
  CPC .. G05B 15/02; H02J 3/14; H02J 9/066; E21B 43/26
  (Continued)

(56) References Cited

U.S. PATENT DOCUMENTS

| 1,541,601 A | 6/1925 | Tribe |
| 1,656,861 A | 1/1928 | Leonard |

(Continued)

FOREIGN PATENT DOCUMENTS

| AU | 2007340913 | 7/2008 |
| CA | 2406801 | 11/2001 |

(Continued)

OTHER PUBLICATIONS

Goodwin, W. D., "High-voltage auxiliary switchgear for power stations," Power Engineering Journal, 1989, 10pg. (Year: 1989).*

(Continued)

*Primary Examiner* — Ryan D. Coyer
(74) *Attorney, Agent, or Firm* — Hogan Lovells US LLP

(57) ABSTRACT

A system for powering equipment used in a hydraulic fracturing operation, the system including at least one first generator in electrical communication with a first switchgear for providing power to primary components of a hydraulic fracturing operation, and at least one second generator in electrical communication with a second switchgear for providing power to backup components of a hydraulic fracturing operation. The at least one first generator is independent of the at least one second generator so that if the at least one first generator loses the ability to generate electricity, the at least one second generator can continue to generate electricity.

9 Claims, 5 Drawing Sheets

(51) Int. Cl.
   *H02J 3/14*     (2006.01)
   *H02J 9/06*     (2006.01)
(52) U.S. Cl.
   CPC .......... *Y02B 70/3225* (2013.01); *Y04S 20/222* (2013.01)
(58) Field of Classification Search
   USPC ....................................................... 700/293
   See application file for complete search history.

(56) References Cited

U.S. PATENT DOCUMENTS

| | | |
|---|---|---|
| 1,671,436 A | 5/1928 | Melott |
| 1,743,771 A | 1/1930 | Hall |
| 1,967,466 A | 7/1934 | Damsel |
| 2,004,077 A | 6/1935 | McCartney |
| 2,183,364 A * | 12/1939 | Bailey ..................... F02D 25/00 123/343 |
| 2,220,622 A | 11/1940 | Aitken |
| 2,244,106 A | 6/1941 | Granberg |
| 2,248,051 A | 7/1941 | Armstrong |
| 2,407,796 A | 9/1946 | Page |
| 2,416,848 A | 3/1947 | Rothery |
| 2,610,741 A | 9/1952 | Schmid |
| 2,753,940 A | 7/1956 | Bonner |
| 2,976,025 A | 3/1961 | Pro |
| 3,055,682 A | 9/1962 | Bacher |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,347,570 A | 10/1967 | Roessler |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,878,884 A | 4/1975 | Raleigh |
| 3,881,551 A | 5/1975 | Terry |
| 3,967,841 A | 7/1976 | Kendrick |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,411,313 A | 10/1983 | Johnson et al. |
| 4,432,064 A | 2/1984 | Barker |
| 4,442,665 A | 4/1984 | Fick |
| 4,456,092 A | 6/1984 | Kubozuka |
| 4,506,982 A | 3/1985 | Smithers et al. |
| 4,512,387 A | 4/1985 | Rodriguez |
| 4,529,887 A * | 7/1985 | Johnson ..................... F02C 6/18 290/40 A |
| 4,538,916 A | 9/1985 | Zimmerman |
| 4,601,629 A | 7/1986 | Zimmerman |
| 4,676,063 A | 6/1987 | Goebel et al. |
| 4,759,674 A | 7/1988 | Schroder |
| 4,768,884 A | 9/1988 | Elkin |
| 4,783,038 A | 11/1988 | Gilbert |
| 4,793,386 A | 12/1988 | Sloan |
| 4,845,981 A | 7/1989 | Pearson |
| 4,922,463 A | 5/1990 | Del Zotto et al. |
| 5,004,400 A | 4/1991 | Handke |
| 5,006,044 A | 4/1991 | Walker, Sr |
| 5,025,861 A | 6/1991 | Huber |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley |
| 5,230,366 A | 7/1993 | Marandi |
| 5,293,947 A | 3/1994 | Stratton |
| 5,334,899 A | 8/1994 | Skybyk |
| 5,366,324 A | 11/1994 | Arlt |
| 5,422,550 A | 6/1995 | McClanahan |
| 5,433,243 A | 7/1995 | Griswold |
| 5,439,066 A | 8/1995 | Gipson |
| 5,486,047 A | 1/1996 | Zimmerman |
| 5,517,822 A | 5/1996 | Haws et al. |
| 5,548,093 A | 8/1996 | Sato |
| 5,549,285 A | 8/1996 | Collins |
| 5,590,976 A | 1/1997 | Kilheffer et al. |
| 5,606,853 A | 3/1997 | Birch |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,791,636 A | 8/1998 | Loziuk |
| 5,798,596 A | 8/1998 | Lordo |
| 5,813,455 A | 9/1998 | Pratt et al. |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann et al. |
| 6,315,523 B1 | 11/2001 | Mills |
| 6,406,011 B1 | 6/2002 | Kosar |
| 6,442,942 B1 | 9/2002 | Kopko |
| 6,477,852 B2 | 11/2002 | Dodo |
| 6,484,490 B1 | 11/2002 | Olsen |
| 6,491,098 B1 | 12/2002 | Dallas |
| 6,510,695 B1 | 1/2003 | Fisher |
| 6,529,135 B1 | 3/2003 | Bowers et al. |
| 6,585,455 B1 | 7/2003 | Petersen et al. |
| 6,626,646 B2 | 9/2003 | Rajewski |
| 6,719,900 B2 | 4/2004 | Hawkins |
| 6,765,304 B2 | 7/2004 | Baten et al. |
| 6,776,227 B2 | 8/2004 | Beida |
| 6,788,022 B2 | 9/2004 | Sopko |
| 6,802,690 B2 | 10/2004 | Han |
| 6,808,303 B2 | 10/2004 | Fisher |
| 6,837,910 B1 | 1/2005 | Yoshikawa |
| 6,931,310 B2 | 8/2005 | Shimizu et al. |
| 6,936,947 B1 | 8/2005 | Leijon |
| 6,985,750 B1 | 1/2006 | Vicknair et al. |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,279,655 B2 | 10/2007 | Blutke |
| 7,308,933 B1 | 12/2007 | Mayfield |
| 7,309,835 B2 | 12/2007 | Morrison |
| 7,312,593 B1 | 12/2007 | Streicher et al. |
| 7,336,514 B2 | 2/2008 | Amarillas |
| 7,341,287 B2 | 3/2008 | Gibb |
| 7,445,041 B2 | 11/2008 | O'Brien |
| 7,494,263 B2 | 2/2009 | Dykstra |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,675,189 B2 * | 3/2010 | Grenier ................... F03D 15/00 290/43 |
| 7,683,499 B2 | 3/2010 | Saucier |
| 7,717,193 B2 | 5/2010 | Egilsson |
| 7,755,310 B2 | 7/2010 | West et al. |
| 7,770,396 B2 | 8/2010 | Roby |
| 7,795,830 B2 | 9/2010 | Johnson |
| 7,807,048 B2 | 10/2010 | Collette |
| 7,835,140 B2 | 11/2010 | Mori |
| 7,845,413 B2 | 12/2010 | Shampine |

(56) References Cited

U.S. PATENT DOCUMENTS

| | | |
|---|---|---|
| 7,900,893 B2 | 3/2011 | Teurlay |
| 7,926,562 B2 | 4/2011 | Poitzsch |
| 7,940,039 B2 | 5/2011 | de Buda |
| 7,894,757 B2 | 7/2011 | Keast |
| 7,977,824 B2 | 7/2011 | Halen et al. |
| 8,037,936 B2 | 10/2011 | Neuroth |
| 8,054,084 B2 | 11/2011 | Schulz et al. |
| 8,083,504 B2 | 12/2011 | Williams |
| 8,091,928 B2 | 1/2012 | Carrier |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,221,513 B2 | 7/2012 | Ariyapadi |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| RE44,444 E | 8/2013 | Dole |
| 8,506,267 B2 | 8/2013 | Gambier et al. |
| 8,534,235 B2 | 9/2013 | Chandler |
| 8,556,302 B2 | 10/2013 | Dole |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope |
| 8,763,387 B2 | 7/2014 | Schmidt |
| 8,774,972 B2 | 7/2014 | Rusnak |
| 8,789,601 B2 | 7/2014 | Broussard |
| 8,795,525 B2 | 8/2014 | McGinnis et al. |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols |
| 9,103,193 B2 | 8/2015 | Coli |
| 9,119,326 B2 | 8/2015 | McDonnell |
| 9,121,257 B2 | 9/2015 | Coli et al. |
| 9,140,105 B2 | 9/2015 | Pattillo |
| 9,140,110 B2 | 9/2015 | Coli et al. |
| 9,160,168 B2 | 10/2015 | Chapel |
| 9,175,554 B1 | 11/2015 | Watson |
| 9,206,684 B2 | 12/2015 | Parra |
| 9,260,253 B2 | 2/2016 | Naizer |
| 9,322,239 B2 | 4/2016 | Angeles Boza et al. |
| 9,324,049 B2 | 4/2016 | Thomeer |
| 9,340,353 B2 | 5/2016 | Oren |
| 9,353,593 B1 | 5/2016 | Lu et al. |
| 9,366,114 B2 | 6/2016 | Coli et al. |
| 9,410,410 B2 | 8/2016 | Broussard |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 | 11/2016 | McIver |
| 9,506,333 B2 | 11/2016 | Castillo et al. |
| 9,513,055 B1 | 12/2016 | Seal |
| 9,534,473 B2 | 1/2017 | Morris |
| 9,562,420 B2 | 2/2017 | Morris et al. |
| 9,587,649 B2 | 3/2017 | Oehring |
| 9,611,728 B2 | 4/2017 | Oehring |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray |
| 9,739,546 B2 | 8/2017 | Bertilsson et al. |
| 9,745,840 B2 | 8/2017 | Oehring |
| 9,790,858 B2 | 10/2017 | Kanebako |
| 9,840,901 B2 | 12/2017 | Oehring |
| 9,863,228 B2 | 1/2018 | Shampine et al. |
| 9,893,500 B2 | 2/2018 | Oehring |
| 9,903,190 B2 | 2/2018 | Conrad |
| 9,909,398 B2 | 3/2018 | Pham |
| 9,915,128 B2 | 3/2018 | Hunter |
| 9,932,799 B2 | 4/2018 | Symchuk |
| 9,945,365 B2 | 4/2018 | Hernandez et al. |
| 9,963,961 B2 | 5/2018 | Hardin |
| 9,970,278 B2 | 5/2018 | Broussard |
| 9,976,351 B2 | 5/2018 | Randall |
| 10,008,880 B2 | 6/2018 | Vicknair |
| 10,020,711 B2 | 7/2018 | Oehring |
| 10,119,381 B2 | 11/2018 | Oehring |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,302,079 B2 | 5/2019 | Kendrick |
| 10,309,205 B2 | 6/2019 | Randall |
| 10,337,308 B2 | 7/2019 | Broussard |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,408,030 B2 | 9/2019 | Oehring |
| 10,408,031 B2 | 9/2019 | Oehring |
| 10,415,332 B2 | 9/2019 | Morris et al. |
| 10,436,026 B2 | 10/2019 | Ounadjela |
| 10,526,882 B2 | 1/2020 | Oehring |
| 10,627,003 B2 | 4/2020 | Dale et al. |
| 10,648,270 B2 | 5/2020 | Brunty et al. |
| 10,648,311 B2 | 5/2020 | Oehring et al. |
| 10,669,471 B2 | 6/2020 | Schmidt et al. |
| 10,669,804 B2 | 6/2020 | Kotrla |
| 10,686,301 B2 | 6/2020 | Oehring et al. |
| 10,690,131 B2 | 6/2020 | Rashid |
| 10,695,950 B2 | 6/2020 | Igo et al. |
| 10,711,576 B2 | 7/2020 | Bishop |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2 | 10/2020 | Fischer et al. |
| 10,934,824 B2 | 3/2021 | Oehring |
| 10,988,998 B2 | 4/2021 | Fischer et al. |
| 11,091,992 B2 | 8/2021 | Broussard |
| 2001/0000996 A1 | 5/2001 | Grimland et al. |
| 2002/0169523 A1* | 11/2002 | Ross ............... B25J 9/1666 700/245 |
| 2003/0056514 A1 | 3/2003 | Lohn |
| 2003/0057704 A1 | 3/2003 | Baten |
| 2003/0079875 A1 | 5/2003 | Weng |
| 2003/0138327 A1 | 7/2003 | Jones et al. |
| 2004/0040746 A1 | 3/2004 | Niedermayr |
| 2004/0045703 A1 | 3/2004 | Hooper et al. |
| 2004/0102109 A1* | 5/2004 | Cratty ............... B63H 21/17 440/113 |
| 2004/0167738 A1 | 8/2004 | Miller |
| 2005/0061548 A1 | 3/2005 | Hooper |
| 2005/0116541 A1 | 6/2005 | Seiver |
| 2005/0201197 A1 | 9/2005 | Duell et al. |

(56) References Cited

U.S. PATENT DOCUMENTS

| | | |
|---|---|---|
| 2005/0274508 A1 | 12/2005 | Folk |
| 2006/0052903 A1 | 3/2006 | Bassett |
| 2006/0065319 A1 | 3/2006 | Csitari |
| 2006/0109141 A1 | 5/2006 | Huang |
| 2006/0260331 A1 | 11/2006 | Andreychuk |
| 2007/0125544 A1 | 6/2007 | Robinson |
| 2007/0131410 A1 | 6/2007 | Hill |
| 2007/0187163 A1 | 8/2007 | Cone |
| 2007/0201305 A1 | 8/2007 | Heilman |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0095644 A1 | 4/2008 | Mantei et al. |
| 2008/0112802 A1 | 5/2008 | Orlando |
| 2008/0137266 A1 | 6/2008 | Jensen |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264640 A1 | 10/2008 | Eslinger |
| 2008/0264649 A1 | 10/2008 | Crawford |
| 2008/0277120 A1 | 11/2008 | Hickie |
| 2008/0288115 A1 | 11/2008 | Rusnak |
| 2009/0045782 A1 | 2/2009 | Datta |
| 2009/0065299 A1 | 3/2009 | Vito |
| 2009/0068031 A1 | 3/2009 | Gambier |
| 2009/0068301 A1 | 3/2009 | Gambier |
| 2009/0072645 A1 | 3/2009 | Quere |
| 2009/0078410 A1 | 3/2009 | Krenek |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0114392 A1 | 5/2009 | Tolman |
| 2009/0145611 A1 | 6/2009 | Pallini, Jr. |
| 2009/0153354 A1 | 6/2009 | Daussin |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins |
| 2009/0315297 A1 | 12/2009 | Nadeau |
| 2010/0000508 A1 | 1/2010 | Chandler |
| 2010/0019574 A1* | 1/2010 | Baldassarre ............. H02J 3/14 307/23 |
| 2010/0038907 A1 | 2/2010 | Hunt |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0193057 A1 | 8/2010 | Garner |
| 2010/0200224 A1 | 8/2010 | Nguete |
| 2010/0250139 A1 | 9/2010 | Hobbs |
| 2010/0281876 A1 | 11/2010 | Khan |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier |
| 2011/0061855 A1 | 3/2011 | Case |
| 2011/0081268 A1 | 4/2011 | Ochoa et al. |
| 2011/0085924 A1 | 4/2011 | Shampine |
| 2011/0110793 A1 | 5/2011 | Leugemors et al. |
| 2011/0166046 A1 | 7/2011 | Weaver |
| 2011/0175397 A1 | 7/2011 | Amrine |
| 2011/0197988 A1 | 8/2011 | Van Vliet |
| 2011/0241590 A1 | 10/2011 | Horikoshi |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0112757 A1 | 5/2012 | Vrankovic et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1* | 9/2012 | Karimi ............. H02J 3/38 701/22 |
| 2012/0247783 A1 | 10/2012 | Berner, Jr. |
| 2012/0255734 A1 | 10/2012 | Coli |
| 2013/0009469 A1* | 1/2013 | Gillett ............. H02J 3/30 307/25 |
| 2013/0025706 A1 | 1/2013 | DeGaray et al. |
| 2013/0051971 A1 | 2/2013 | Wyse et al. |
| 2013/0078114 A1 | 3/2013 | Van Rijswick |
| 2013/0138254 A1 | 5/2013 | Seals |
| 2013/0175038 A1 | 7/2013 | Conrad |
| 2013/0175039 A1 | 7/2013 | Guidry |
| 2013/0180722 A1 | 7/2013 | Olarte Caro |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce |
| 2013/0306322 A1 | 11/2013 | Sanborn |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1* | 2/2014 | Jain ............. H02J 3/46 307/65 |
| 2014/0060658 A1 | 3/2014 | Hains |
| 2014/0077607 A1 | 3/2014 | Clarke |
| 2014/0095114 A1 | 4/2014 | Thomeer |
| 2014/0096974 A1* | 4/2014 | Coli ............. E21B 43/26 166/358 |
| 2014/0124162 A1 | 5/2014 | Leavitt |
| 2014/0138079 A1 | 5/2014 | Broussard |
| 2014/0174717 A1 | 6/2014 | Broussard et al. |
| 2014/0219824 A1 | 8/2014 | Burnette |
| 2014/0238683 A1 | 8/2014 | Korach |
| 2014/0246211 A1 | 9/2014 | Guidry |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0294603 A1 | 10/2014 | Best |
| 2014/0379300 A1 | 12/2014 | Devine |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez |
| 2015/0314225 A1 | 11/2015 | Coli et al. |
| 2015/0330172 A1 | 11/2015 | Allmaras |

(56) References Cited

U.S. PATENT DOCUMENTS

| | | |
|---|---|---|
| 2015/0354322 A1 | 12/2015 | Vicknair |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz |
| 2016/0230660 A1 | 8/2016 | Zeitoun et al. |
| 2016/0258267 A1 | 9/2016 | Payne |
| 2016/0265457 A1 | 9/2016 | Stephenson |
| 2016/0273328 A1 | 9/2016 | Oehring |
| 2016/0273456 A1 | 9/2016 | Zhang et al. |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326853 A1 | 11/2016 | Fred et al. |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring |
| 2017/0096889 A1 | 4/2017 | Blanckaert et al. |
| 2017/0104389 A1 | 4/2017 | Morris et al. |
| 2017/0114625 A1 | 4/2017 | Norris |
| 2017/0130743 A1 | 5/2017 | Anderson |
| 2017/0138171 A1 | 5/2017 | Richards et al. |
| 2017/0146189 A1 | 5/2017 | Herman |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett |
| 2017/0212535 A1 | 7/2017 | Shelman et al. |
| 2017/0218727 A1 | 8/2017 | Oehring |
| 2017/0218843 A1 | 8/2017 | Oehring et al. |
| 2017/0222409 A1 | 8/2017 | Oehring et al. |
| 2017/0226838 A1 | 8/2017 | Ciezobka |
| 2017/0226842 A1 | 8/2017 | Omont |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye |
| 2017/0328179 A1 | 11/2017 | Dykstra |
| 2017/0369258 A1 | 12/2017 | DeGaray |
| 2017/0370639 A1 | 12/2017 | Barden et al. |
| 2018/0028992 A1 | 2/2018 | Stegemoeller |
| 2018/0038216 A1 | 2/2018 | Zhang |
| 2018/0045331 A1 | 2/2018 | Lopez |
| 2018/0090914 A1 | 3/2018 | Johnson et al. |
| 2018/0181830 A1 | 6/2018 | Laharuka et al. |
| 2018/0216455 A1 | 8/2018 | Andreychuk |
| 2018/0238147 A1 | 8/2018 | Shahri |
| 2018/0245428 A1 | 8/2018 | Richards |
| 2018/0259080 A1 | 9/2018 | Dale et al. |
| 2018/0266217 A1 | 9/2018 | Funkhauser et al. |
| 2018/0266412 A1 | 9/2018 | Stokkevag |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0320483 A1 | 11/2018 | Zhang |
| 2018/0343125 A1 | 11/2018 | Clish |
| 2018/0363437 A1 | 12/2018 | Coli |
| 2018/0363640 A1 | 12/2018 | Kajita et al. |
| 2018/0366950 A1 | 12/2018 | Pedersen et al. |
| 2019/0003329 A1 | 1/2019 | Morris |
| 2019/0010793 A1 | 1/2019 | Hinderliter |
| 2019/0040727 A1 | 2/2019 | Oehring et al. |
| 2019/0063309 A1 | 2/2019 | Davis |
| 2019/0100989 A1 | 4/2019 | Stewart |
| 2019/0112910 A1 | 4/2019 | Oehring |
| 2019/0119096 A1 | 4/2019 | Haile |
| 2019/0120024 A1 | 4/2019 | Oehring |
| 2019/0128080 A1 | 5/2019 | Ross |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0249527 A1 | 8/2019 | Kraynek |
| 2019/0257462 A1 | 8/2019 | Rogers |
| 2019/0292866 A1 | 9/2019 | Ross |
| 2019/0292891 A1 | 9/2019 | Kajaria |
| 2019/0316447 A1 | 10/2019 | Oehring |
| 2020/0040878 A1 | 2/2020 | Morris |
| 2020/0047141 A1 | 2/2020 | Oehring et al. |
| 2020/0088152 A1 | 3/2020 | Allion et al. |
| 2020/0232454 A1 | 7/2020 | Chretien |
| 2020/0325760 A1 | 10/2020 | Markham |
| 2020/0350790 A1 | 11/2020 | Luft et al. |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |

(56) References Cited

FOREIGN PATENT DOCUMENTS

| | | |
|---|---|---|
| CN | 104117308 A | 10/2014 |
| CN | 104196613 A | 12/2014 |
| CN | 205986303 U | 2/2017 |
| CN | 108049999 A | 5/2018 |
| CN | 112196508 A | 1/2021 |
| JP | 2004264589 | 9/2004 |
| WO | 00/47893 | 8/2000 |
| WO | 2009046280 | 4/2009 |
| WO | 2012/051705 | 4/2012 |
| WO | 2014/116761 | 7/2014 |
| WO | 2014/177346 | 11/2014 |
| WO | 2014177346 | 11/2014 |
| WO | 2016/144939 | 9/2016 |
| WO | 2016/160458 | 10/2016 |
| WO | 2018044307 A1 | 3/2018 |
| WO | 2018213925 A1 | 11/2018 |
| WO | 2019210417 | 11/2019 |

OTHER PUBLICATIONS

Woodbury et al., "Electrical Design Considerations for Drilling Rigs," IEEE, 1976, 11pg. (Year: 1976).*
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Non-Final Office Action issued in Corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 2017.
Final Office Action issued in corresponding U.S. Appl. No. 15/145,491 dated Sep. 6, 2017.
UK Power Networks—Transformers to Supply Heat to Tate Modern—from Press Releases May 16, 2013.
Non-Final Office Action dated Nov. 29, 2017 in related U.S. Appl. No. 15/145,414.
Non-Final Office Action dated Nov. 13, 2017 in related U.S. Appl. No. 15/644,487.
Canadian Office Action dated Jun. 22, 2018 in related Canadian Patent Application No. 2,886,697.
Office Action dated Jul. 25, 2018 in related U.S. Appl. No. 15/644,487.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Canadian Office Action dated Apr. 18, 2018 in related Canadian Patent Application No. 2,928,711.
Non-Final Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Non-Final Office Action dated Feb. 12, 2019 in related U.S. Appl. No. 16/170,695.
International Search Report and Written Opinion dated Feb. 15, 2019 in related PCT Application No. PCT/US18/63977.
Non-Final Office Action dated Feb. 25, 2019 in related U.S. Appl. No. 16/210,749.
International Search Report and Written Opinion dated Mar. 5, 2019 in related PCT Application No. PCT/US18/63970.
Non-Final Office Action dated Mar. 6, 2019 in related U.S. Appl. No. 15/183,387.
Office Action dated Mar. 1, 2019 in related Canadian Patent Application No. 2,943,275.
Office Action dated Jan. 30, 2019 in related Canadian Patent Application No. 2,936,997.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.
"Griswold Model 811 Pumps: Installation, Operation and Maintenance Manual, ANSI Process Pump," 2010, 60 pages.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.
International Search Report and Written Opinion dated Nov. 26, 2019 in related PCT Application No. PCT/US19/51018.
International Search Report and Written Opinion dated Feb. 11, 2020 in related PCT Application No. PCT/US2019/055323.
Final Office Action dated Mar. 31, 2020 in related U.S. Appl. No. 15/356,436.
Non-Final Office Action dated Mar. 3, 2020 in related U.S. Appl. No. 16/152,695.
International Search Report and Written Opinion dated Jul. 9, 2019 in corresponding PCT Application No. PCT/US2019/027584.
Office Action dated Jun. 11, 2019 in corresponding U.S. Appl. No. 16/210,749.
Office Action dated May 10, 2019 in corresponding U.S. Appl. No. 16/268,030.
Canadian Office Action dated May 30, 2019 in corresponding CA Application No. 2,833,711.
Canadian Office Action dated Jun. 20, 2019 in corresponding CA Application No. 2,964,597.
Office Action dated Jun. 7, 2019 in corresponding U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.

(56) References Cited

OTHER PUBLICATIONS

Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sept. 3, 2019 in related U.S. Appl. No. 15/994,772.
Office Action dated Sep. 20, 2019 in related U.S. Appl. No. 16/443,273.
Canadian Office Action dated Oct. 1, 2019 in related Canadian Patent Application No. 2,936,997.
International Search Report and Written Opinion dated Jun. 2, 2020 in corresponding PCT Application No. PCT/US20/23809.
International Search Report and Written Opinion dated Jun. 23, 2020 in corresponding PCT Application No. PCT/US20/23912.
International Search Report and Written Opinion dated Jul. 22, 2020 in corresponding PCT Application No. PCT/US20/00017.
Office Action dated Aug. 4, 2020 in related U.S. Appl. No. 16/385,070.
Office Action dated Jun. 29, 2020 in related U.S. Appl. No. 16/404,283.
Office Action dated Jun. 29, 2020 in related U.S. Appl. No. 16/728,359.
Office Action dated Jun. 22, 2020 in related U.S. Appl. No. 16/377,861.
Canadian Office Action dated Aug. 18, 2020 in related CA Patent Application No. 2,933,444.
Canadian Office Action dated Aug. 17, 2020 in related CA Patent Application No. 2,944,968.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocess-burner) Sep. 6, 2018 (Sep. 6, 2018), entire document, especially para (Burners for refinery Heaters].
Water and Glycol Heating Systems• (https://www.heat-inc.com/wg-series-water-glycol-systems/) Jun. 18, 2018 (Jun. 18, 2018), entire document, especially WG Series Water Glycol Systems.
"Heat Exchanger" (https://en.wiklpedia.org/w/index.php?title=Heat_exchanger&oldid=89300146) Dec. 18, 2019 Apr. 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
International Search Report and Written Opinion issued in PCT/US2020/023809 dated Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).
Morris et al., U.S. Appl. No. 62/526,869; Hydration-Blender Transport and Electric Power Distribution for Fracturing Operation; Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
Gardner Denver, 3' 1502 Male Hammer Union Discharge Flange, 2005, 13 pages.
"Services—U.S. Well Services," http://uswellservices.com/services/, accessed Nov. 13, 2021, 10 pages.
Donald G. Fink, "Standard Handbook for Electrical Engineers—Thirteenth Edition," 1993, McGraw-Hill Inc., pp. 10-3, 20-21, 20-22, 20-85, 20-20, 20-89, 20-90, 20-91, 22-12, 22-13, 22-14, 22-15 and 22-16.
Email from Michael See on Jun. 10, 2021 regarding API-541 Fourth Edition: Public Availability, 2 pages.
Halliburton, Halliburtion All-Electric Fracturing Reducing Emissions and Cost Brochure, 2021, 6 pages.
IEEE Power Engineering Society, 112 IEEE Standard Test Procedure for Polyphase Induction Motors and Generators, 2004, 87 pages.
U.S. Well Services, LLC v Tops Well Services, LLC, Case No. 3:19-cv-237, Document 135, Order, Sep. 22, 2021, 2 pages.
U.S. Well Services, Inc. and U.S. Well Services, LLC v Halliburton Company and Cimarex Energy Co., Case No. 6:21-cv-00367-ADA, Document 56, Defendants' Opening Claim Construction Brief, Oct. 27, 2021, 46 pages.
"Screenshot of USWS Clean Fleet System Video," 1 page.
John Daniel, "8.30 DEP Industry Observations: New Flac Fleet; New Fleet Designs Forthcoming," Daniel Energy Partners, Aug. 30, 2020, 13 pages.
Declaration of Joel N. Broussard, IPR2021-01034, IPR2021-01035, IPR2021-01036, and IPR2021-01037, Oct. 20, 2021, 11 pages.
Declaration of Robert Schaaf, IPR2021-01034, Oct. 20, 2021, 47 pages.
Declaration of Dr. Mark Ehsani, IPR2021-01035, Jun. 18, 2021, 188 pages.
U.S. Pat. No. 9,970,278, 310 pages.
Stan Gibilisco, The Illustrated Dictionary of Electronics: Audio/Video Consumer Electronics Wireless Technology—Eighth Edition, 2001, p. 667.
Declaration of Robert Schaaf, IPR2021-01035, Oct. 20, 2021, 51 pages.
Declaration of Dr. L. Brun Hilbert, P.E., IPR2021-01037 and IPR2021-01038, Jun. 21, 2021, 124 pages.
U.S. Pat. No. 9,745,840, 215 pages.
U.S. Pat. No. 10,408,030, 401 pages.

(56) References Cited

OTHER PUBLICATIONS

U.S. Appl. No. 62/242,173, 17 pages.
Declaration of Robert Schaaf, IPR2021-01037, Oct. 20, 2021, 52 pages.
Zeus Electric Pumping Unit, Halliburton, http://www.halliburton.com/en/products/zeus-electric-pumping-unit, 2021, 4 pages.
Declaration of Joel N. Broussard, IPR2021-01038, Oct. 20, 2021, 11 pages.
*LedComm LLC* v *Signify North America Corporation*, Case No. 6:20-cv-01056-ADA, Civil Docket, accessed Dec. 3, 2021, 11 pages.
*U.S. Well Services, Inc.* v *Halliburton Company*, Case No. 6:21-cv-00367-ADA, Civil Docket, accessed Dec. 13, 2021, 14 pages.
Declaration of Robert Schaaf, IPR2021-01038, Nov. 10, 2021, 40 pages.
*Transcend Shipping Systems LLC* v *Mediterranean Shipping Company S.A.*, Case No. 6:21-cv-00040, Document 27, Order of Dismissal with Prejudice, Dec. 7, 2021, 1 page.
Centers for Disease Control and Prevention, NIOSH Numbered Publications, https://web.archive.org/web/20120721180008/http://www.cdc.org/niosh/pubs/all_date_desc_nopubnumbers.html, 2012, 57 pages.
America Invents Act, H.R. Rep. No. 112-98, Jun. 1, 2011, 165 pages.
Declaration of Joel N. Broussard, IPR2021-01065, Oct. 20, 2021, 11 pages.
Declaration of Dr. Robert Durham, IPR2021-01065, Jun. 18, 2021, 138 pages.
Declaration of Robert Schaaf, IPR2021-01065, Nov. 10, 2021, 33 pages.
U.S. Pat. No. 9,410,410, Excerpt—Response to Non-Final Office Action filed Feb. 3, 2016, 57 pages.
U.S. Pat. No. 9,840,901, 216 pages.
U.S. Appl. No. 62/242,566, 34 pages.
Industrial Safety & Hygiene News, OSHA issues hazard alert for fracking and drilling, Jan. 6, 2015, 1 page.
Portfolio Media Inc., A Shift to Sand: Spotlight on Silica Use in Fracking, Law360, https://www.law360.com/articles/366057/print?section=energy, accessed Jun. 10, 2021, 5 pages.
Henry Chajet, "OSHA Issues Alert on Non-Silica Fracking Hazards," Jan. 30, 2015, National Law Review Newsroom, 2 pages.
*U.S. Well Services, LLC,* v *Voltagrid LLC*, Nathan Ough, Certarus (USA) Ltd., and Jared Oehring, Case No. 4:21-cv-3441-LHR, Document 13, Plaintiff U.S. Well Services, LLC's Motion for Preliminary Injunction and Request for Hearing, Nov. 4, 2021, 311 pages.
U.S. Department of Labor—Occupational Safety and Health Administration, Hydraulic Fracturing and Flowback Hazards Other than Respirable Silica, 27 pages.
U.S. Department of Labor—Occupational Safety and Health Administration, Hazard Alert—Worker Exposure to Silica Turing Hydraulic Fracturing, 2012, 7 pages.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.
Occupational Safety and Health Administration—Home, United States Department of Labor, https://web.archive.org/web/20120722160756/http://www.osha.gov/, accessed Jun. 13, 2021, 2 pages.
Industry/Hazard Alerts, United States Department of Labor, https://web.archive.org/web/20120801064838/http://www.osha.gov:80/hazardindex.html, accessed Jun. 13, 2021, 1 page.
Hazard Alert—Worker Exposure to Silica during Hydraulic Fracturing, United States Department of Labor, https://web.archive.org/web/20120808200919/http://www.osha.gov/dts/hazardalerts/hydraulic_frac_hazard_alert.html, accessed Jun. 13, 2021, 5 pages.
A. Abbott, Crippling the Innovation Economy: Regulatory Overreach at the Patent Office, Regulatory Transparency Project, Aug. 14, 2017, 35 pages.
D. Heidel, Safety and Health Management Aspects for Handling Silica-based Products and Engineered Nanoparticles in Sequences of Shale Reservoir Stimulations Operations, Society of Petroleum Engineers, 2004, 4 pages.
Testimony of Judge Paul R. Michel (Ret.) United States Court of Appeals for the Federal Circuit Before the Subcommittee on Intellectual Property, U.S. Senate Committee on the Judiciary, Jun. 4, 2019, 8 pages.
Bernard D. Goldstein, The Role of Toxicological Science in Meeting the Challenges and Opportunities of Hydraulic Fracturing, 2014, Toxicological Sciences, vol. 139, No. 2, pp. 271-283.
Mike Soraghan, OSHA issues hazard alert for fracking and drilling, E&E, Dec. 10, 2014, 1 page.
*U.S. Well Services, LLC* v *Tops Well Services, LLC and Honghua America, LLC*, Case No. 3:19-cv-00237, Document 72-9, Declaration of Dr. Robert Schaaf, Apr. 24, 2020, 52 pages.
*U.S. Well Services, LLC* v *Tops Well Services, LLC and Honghua America, LLC*, Case No. 3:19-cv-00237 Document 72-9, Declaration of Dr. Robert Schaaf—part 2, Apr. 24, 2020, 128 pages.
*U.S. Well Services, LLC* v *Tops Well Services, LLC and Honghua America, LLC*, Case No. 3:19-cv-00237, Document 72-9, Declaration of Dr. Robert Schaaf—part 3, Apr. 24, 2020, 47 pages.
*U.S. Well Services, LLC* v *Tops Well Services, LLC and Honghua America, LLC*, Case No. 3:19-cv-00237, Document 72, Plaintiffs Opening Claim Construction Brief, Apr. 24, 2020, 37 pages.
*U.S. Well Services, LLC* v *Tops Well Services, LLC and Honghua America, LLC*, Case No. 3:19-cv-00237, Document 1, Plaintiffs Original Complaint, 63 pages.
*U.S. Well Services, LLC* v *Tops Well Services, LLC and Honghua America, LLC*, Case No. 3:19-cv-00237, Document 90, Plaintiffs Opposition to Defendants' Motion for Summary Judgment of Invalidity under 35 USC 112, 30 pages.
*U.S. Well Services, LLC* v *Tops Well Services, LLC and Honghua America, LLC*, Case No. 3:19-cv-00237, Document 116, Hearing on Markman and Summary Judgment via Video Conference before the Honorable Andrew M. Edison Day 1 of 1 Day—Transcript, Jun. 15, 2020, 308 pages.
*Kirsch Research and Development, LLC* v *Tarco Specialty Products, Inc.*, Case No. 6:20-cv-00318-ADA, Document 62, Memorandum Opinion and Order Granting Defendant's Opposed Motion to Stay Pending Inter Partes Review of the '482 Patent [ECF No. 57], Oct. 4, 2021, 6 pages.
*Ledcomm LLC* v *Signfiy North America Corp., Signify Holding B.V., and Signify N.V.*, Case No. 6:20-cv-01056-ADA, Document 24, Scheduling Order, Aug. 13, 2021, 4 pages.
Transcend Shipping Systems, LLC and Hapag-Lloyd AG and Hapag-Lloyd (America) LLC, CMA CGM (America) LLC and CMA CGM S.A., Mediterranean Shipping Company S.A., Case Nos. 6:20-cv-1195-ADA, 6:21-cv-0018-ADA, and 6:21-cv-0040-ADA, Document 19, Proposed Amended Scheduling Order, Aug. 13, 2021, 6 pages.
*U.S. Well Services, Inc. and U.S. Well Services, LLC* v *Halliburton Company and Cimarex Energy Co.*, Case No. 6:21-cv-00367-ADA, Document 51, Agreed Scheduling Order, Sep. 16, 2021, 5 pages.
*U.S. Well Services, Inc. and U.S. Well Services, LLC* v *Halliburton Company and Cimarex Energy Co.*, Case No. 6:21-cv-00367-ADA, Plaintiffs Disclosure of Asserted Claims and Preliminary Infringement Contentions, Jul. 12, 2021, 9 pages.
*U.S. Well Services, Inc. and U.S. Well Services, LLC* v *Halliburton Company and Cimarex Energy Co.*, Case No. 6:21-cv-00367-ADA, Plaintiff U.S. Well Services, LLC's Disclosure of Extrinsic Evidence, Oct. 19, 2021, 10 pages.
*U.S. Well Services, Inc. and U.S. Well Services, LLC* v *Halliburton Company and Cimarex Energy Co.*, Case No. 6:21-cv-00367-ADA, Defendants' Preliminary Invalidity Contentions, Sep. 10, 2021, 193 pages.
*U.S. Well Services, Inc. and U.S. Well Services, LLC* v *Halliburton Company and Cimarex Energy Co.*, Case No. 6:21-cv-00367-ADA, Document 1-8, Exhibit H, Halliburton—All Electric Fracturing Reducing Emissions and Cost, Apr. 15, 2021, 6 pages.
Bill Lockley and Barry Wood, "What do the API Motor/Generator Features Cost and What Do They Buy You?" 2010 IEEE, Paper No. PCIC-2010-22, 10 pages.

(56) References Cited

OTHER PUBLICATIONS

American Petroleum Institute, "Form-wound Squirrel-Cage Induction Motors—500 Horsepower and Larger," Jun. 2004, Fourth Edition, ANSI/API Standard 541-2003, 88 pages.
Assignment record of U.S. Pat. No. 9,366,114, accessed Aug. 19, 2021, 2 pages.
ASTM International, "Standard Specification for Steel Bars, Carbon and Alloy, Hot-Wrought, General Requirements" Oct. 13, 2006, 16 pages.
"U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-125-203000637.html?guccounter=1, 6 pages.
Declaration of Joel N. Broussard, Case Nos. IPR2021-01032 & IPR2021-01033, Oct. 13, 2021, 9 pages.
Declaration of Dr. Robert Durham, Case Nos. IPR2021-01033, IPR2021-01032 and IPR2021-01034, Jun. 18, 2021, 179 pages.
Declaration of Robert Schaaf, Case Nos. IPR2021-01032 and IPR2021-01033, Oct. 12, 2021, 45 pages.
Declaration of Sylvia D. Hall-Ellis, Ph D., Case Nos. IPR2021-01032, IPR2021-01033, and IPR2021-01034, Jun. 18, 2021, 173 pages.
Stephen Cary et al, "Electric Rotating Machine Standards Part II: Magnetic Wedge Design & Monitoring Methods," 2011 IEEE, Paper No. PCIC-2011-41, 8 pages.
Janice Hoppe-Spiers, "Deploying Change," Energy & Mining International, Spring 2017, http://www.emi-magazine.com, 5 pages.
Jim Harris, "U.S. Well Services LLC—Energy and Mining Magazine," Energy & Mining International, Oct. 12, 2021, https://www.emi-magazine.com/sections/profiles/1221-us-well-services-llc, 3 pages.
U.S. Pat. No. 8,789,601, 159 pages.
U.S. Pat. No. 9,410,410, 263 pages.
U.S. Pat. No. 10,337,308, 861 pages.
"Clean Fleet Reduces Emissions by 99% at Hydraulic Fracturing Sites," Fluid Power Journal, https://fluidpowerjournal.com/clean-fleet-reduces-emissions/, accessed Sep. 22, 2021, 5 pages.
Gardner Denver, Well Servicing Pump Model GD-2500Q Quintuplex—Operating and Service Manual, Aug. 2005, 46 pages.
"Halliburton Delivers Successful Grid-Powered Frac Operation," https://www.halliburton.com/en/about-us/press-release/halliburton-delivers-first-successful-grid-powered-fracturing-operation, accessed Sep. 27, 2021, 4 pages.
Hart Energy, Hydraulic Fracturing Techbook, 2015, 99 pages.
R. Mistry et al., "Induction Motor Vibrations in view of the API 541—4th Edition," IEEE, accessed Jun. 10, 2021, 10 pages.
"Game-changing hydraulic fracturing technology, reduces emissions by 99%," Intrado Globe News Wire, Oct. 1, 2014, https://www.globenewswire.com/fr/news-release/2014/10/01/670029/10100696/en/Game-changing-hydraulic-facturing-technology-reduces-emissions-by-99.html, 4 pages.
M. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.
D. Bogh et al., "A User's Guide to Factory Testing of Large Motors: What Should Your Witness Expect," IEEE, accessed Jun. 10, 2021, 8 pages.
Ryan Davis, "Albright Says He'll Very Rarely Put Cases on Hold for PTAB," Law 360, https://www.law360.com/articles/1381597/print?section=ip, 2 pages.
Dani Kass, "Fintiv Fails: PTAB Uses 'Remarkably Inaccurate' Trial Dates," Nov. 2, 2021, Law 360, 1 page.
Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21,20-22, 20-85, 20-86, 20-89, and 20-90.
T. W. Pascall et al., "Navigating the Test Requirements of API 541 4th Edition," 2007, IEEE, Paper No. PCIC-2007-11, 12 pages.
"Kerr Pumps & FlowVale Awards for Excellence in Well Completion, Northeast 2017—Awarded to: U.S. Well Services," https://www.oilandgasawards.com/winner/northeast-2017-kerr-pumps-flowvale-awards . . . , accessed Oct. 5, 2021, 4 pages.
"New Technology Development Award—General/Products, Northeast 2015—Awarded to: U.S. Well Services, LLC," https://www.oilandgasawards.com/winner/northeast-2015-new-technology-development-award-generalproducts/#, accessed Aug. 23, 2021, 4 pages.
*U.S. Well Services, Inc.* v. *Halliburton Company*, Civil Docket for Case # 6:21-cv-00367-ADA, https://ecf.txwd.uscourts.gov/cgi-bin/DktRpt.pl?190912742001885-L_1_0-1, Accessed Nov. 29, 2021, 13 pages.
A. T. Dufresne, "How reliable are trial dates relied on by the PTAB in the Fintiv analysis?" Perkins Coie, 2021, 3 pages.
J. Malinowski et al., "Petrochemical Standards A Comparison Between IEEE 841-2001, API 541, and API 547," 2004, IEEE, Paper No. PCIC-2004-22, 8 pages.
"Petroleum Alumnus and Team Develop Mobile Fracturing Unit that Alleviates Environmental Impact," 2015, LSU, https://www.lsu.edu/eng/news/2015/07/20150713-mobile-fracturing-unit.php, accessed Sep. 22, 2021, 2 pages.
Liz Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
"VZ Environmental Award of Excellence in Environmental Stewardship, Rocky Mountain 2016—Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.
Austin H. Bonnett, "Root Cause Failure Analysis for AC Induction Motors in the Petroleum and Chemical Industry," 2010, IEEE, Paper No. PCIC-2010-43, 13 pages.
Carolyn Davis, "Natural Gas Finding Niche in E-Fracking, But Diesel Still Rules," Sep. 6, 2019, Natural Gas Intel, https://www.naturalgasintel.com/natural-gas-finding-niche-in-e-fracking-but-diesel-still-rules, 9 pages.
Tim Rahill and Michael C. Fousha, "Sorting Out the Overlap," Jan./Feb. 2009, IEEE Industry Applications Magazine, 12 pages.
Jodi Shafto, "Growth in electric-fracking fleets stunted by tight producer budgets," Aug. 6, 2019, S&P Global Market Intelligence, https://wwww.spglobal.com/marketintelligence/en/news-insights/latest-news-headlines/growth-in-electric-fracking-fleets-stunted-by-tight-producer-budgets, accessed Sep. 16, 2021, 4 pages.
A. H. Bonnett et al., "Squirrel Cage Rotor Options for A.C. Induction Motors," IEEE, accessed May 18, 2021, 4 pages.
U.S. Well Services Investor and Analyst Update: Second Quarter 2021 in Review, 2021, 7 pages.
Standing Order Governing Proceedings—Patent Cases, in the United States District Court for the Western District of Texas, Waco Division, filed Nov. 17, 2021, 11 pages.
U.S. Well Services—Services, http://uswellservices.com/services/, accessed Nov. 13, 2021, 10 pages.
Elsevier, "Variable Speed Pumping—A Guide to Successful Applications," 2019, 186 pages.
*U.S. Well Services, Inc., and U.S. Well Services, LLC* v *Halliburton Company, Cimarex Energy Co., Halliburton Energy Services, Inc., and Halliburton US Techologies, Inc.*, Case No. WA:21-CV-00367-ADA, Document 61, Order Setting Markman Hearing, Nov. 29, 2021, 1 page.
*U.S. Well Services, Inc., and U.S. Well Services, LLC* v *Halliburton Company, Cimarex Energy Co., Halliburton Energy Services, Inc., and Halliburton US Techologies, Inc.*, Case No. WA:21-CV-00367-ADA, Document 61, Order Resetting Markman Hearing, Dec. 8, 2021, 1 page.
Affidavit of Duncan Hall, Internet Archives on Jun. 7, 2021, https://web.archive.org/web/20120917102614/http:/www.quincieoilfield.

(56) References Cited

OTHER PUBLICATIONS com/pdf/3.0%20Gardner%20Denver/2500/GD2500Q%200p%20&%20Service%20Manual.pdf, 76 pages.
The American Heritage Dictionary of the English Language, Fifth Edition, Fiftieth Anniversary, p. 911.
Collins English Dictionary, Twelfth Edition, 2014, p. 1005.
Declaration of Robert Schaaf, IPR2021-01539, Jan. 25, 2022, 37 pages.
Department of Transportation, Federal Motor Carrier Safety Administration, 49 CFR Parts 390, 392 and 393—Parts and Accessories Necessary for Safe Operation; General Amendments; Final Rule, Federal Register, Aug. 15, 2005, vol. 70, No. 156, 49 pages.
U.S. Pat. No. 10,648,311, 1,804 pages.
D. Nedelcut et al., "On-line and Off-line Monitoring-Diagnosis System (MDS) for Power Transformers," IEEE, 2008 International Conference on Condition Monitoring and Diagnosis, Beijing, China, Apr. 21-24, 2008, 7 pages.
Random House Webster's Unabridged Dictionary, Second Edition, 2001, p. 990.
A. B. Lobo Ribeiro et al, "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.
Society of Automotive Engineers, SAE J1292: Automobile, Truck, Truck-Tractor, Trailer, and Motor Coach Wiring, 49 CFR 393.28, Oct. 1981, 6 pages.
"StarTech NETRS2321E 1 Port RS-232/422/485 Serial over IP Ethernet Device Server," StarTech, http://www.amazon.com/StarTech-NETRS2321E-RS-232-Serial-Ethernet/dp/B000YN0N0S, May 31, 2014, 4 pages.
"StarTech.com 1 Port RS232 Serial to IP Ethernet Converter (NETRS2321P)," StarTech, http://www.amazon.com/StarTech-com-Serial-Ethernet-Converter-NETRS232IP/dp/B00FJEHNSO, Oct. 9, 2014, 4 pages.
"TCP/IP Ethernet to Serial RS232 RS485 RS422 Converter," Atc, http://www.amazon.com/Ethernet-Serial-RS232-RS485-Converter/dp/B00ATV2DX2, Feb. 1, 2014, 2 pages.
"SainSmart TCP/IP Ethernet to Serial RS232 RS485 Intelligent Communication Converter," SainSmart, http://www.amazon.com/SainSmart-Ethemet-Intelligent-Communication-Converter/dp/B008BGLUHW, Aug. 17, 2014, 4 pages.
"Global Cache iTach, IP to Serial with PoE (IP2SL-P)," Global Cache, https://www.amazon.com/Global-Cache-iTach-Serial-IP2SL-P/dp/B003BFVNS4/, Oct. 30, 2014, 3 pages.
Declaration of Robert Durham, IPR2022-00074, Nov. 8, 2021, 177 pages.
Declaration of Robert Schaaf, IPR2022-00074, Feb. 17, 2022, 36 pages.
U.S. Pat. No. 10,254,732, 552 pages.
U.S. Appl. No. 62/204,331, 22 pages.
Eugene A. Avallone, Marks' Standard Handbook for Mechanical Engineers: 11th Edition, 2007, p. 16-4 and 16-22.
Moxa 802.11 Ethernet to Serial, Moxastore, http://www.moxastore.com/Moxa_802_11_Wi_Fi_Ethernet_to_Serial_s/587.html, May 24, 2016, 1 page.
Project Registration, Moxastore, http://www.moxastore.com, Feb. 15, 2015, 2 pages.
About Us, Moxastore, http://www.moxastore.com/aboutus.asp, Mar. 8, 2015, 1 page.
NPORTIA5250, Moxastore, http://www.moxastore.com/NPORTIA5250_p/nportia5250.htm.
Declaration of Duncan Hall, Internet Archive, Oct. 26, 2021, https://web.archive.org/web/20140531134153/http://www.amazon.com/StarTech-NETRS2321E-RS-232-Serial-Ethernet/dp/B000YB0NOS, 43 pages.
Michael Quentin Morton, Unlocking the Earth: A Short History of Hydraulic Fracturing (2013), GeoExpro, vol. 10, No. 6, 5 pages.
Accommodating Seismic Movement, Victaulic Company, 2015, https://web.archive.org/web/20150412042941/http://www.victaulic.com:80/en/businesses-solutions/solutions/accommoda . . . , 2 pages.
Style W77 AGS Flexible Coupling, Victaulic Company 2015, https://web.archive.org/web/20150423052817/http://www.victaulic.com:80/en/products-services/products/style-w77-ags-f . . . , 1 page.
AGS Large Diameter Solutions, Victaulic Company, 2015, https://web.archive.org/web/20150419063052/http://www.victaulic.com:80/en/businesses-solutions/solutions/advanced-gr . . . , 2 pages.
Chiksan Original Swivel Joints, FMC, 1997, 16 pages.
CoorsTek Flowguard Products, 2012, 8 pages.
Declaration of Sylvia D. Hall-Ellis, IPR2022-00610, Feb. 28, 2022, 98 pages.
U.S. Pat. No. 10,119,381, 24 pages.
U.S. Pat. No. 10,934,824, 24 pages.
Flowline Products and Services, FMC Technologies, http://www.fmctechnologies.com, 80 pages.
Gardner Denver, Well Servicing Pump Model GD-2500Q, GD-2500Q-HD, Quintuplex Pumps, Sep. 2011, 45 pages.
Eugene A. Avallone, Marks' Standard Handbook for Mechanical Engineers: 11th Edition, 2007, Section 14, 18 pages.
Mohinder L. Nayyar, Piping Handbook Seventh Edition, McGraw-Hill Handbook, 2000, 77 pages.
Pulsation Dampers, Coorstek, 2014, https://web.archive.org/web/20140919005733/http://coorstek.com/markets/energy_equip . . . , 2 pages.
M. E. Rahman et al., "Wire rope isolators for vibration isolation of equipment and structures—A review," IOP Conference Series Materials Science and Engineering, Apr. 2015, 12 pages.
Victaulic Couplings Vibration Attenuation Characteristics, Victaulic, Publication 26.04, Oct. 2014, 5 pages.
Thorndike Saville, The Victaulic Pipe Joint, Journal of American Water Works Association, Nov. 1922, vol. 9, No. 6, pp. 921-927.
J. C. Wachel et al., "Analysis of Vibration and Failure Problems in Reciprocating Triplex Pumps for Oil Pipelines," The American Society of Mechanical Engineers, Presented at the Energy-Sources and Technology Conference and Exhibition, Dallas, Texas, Feb. 17-21, 1985, 8 pages.
Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Wire Rope Isolator Technologies, Enidine, Dec. 2011, 78 pages.
World's Best Swivel Joints, Flowvalve, 2013, https://web.archive.org/web/20150117041757/http://www.flowvalve.com:80/swivels, 10 pages.
U.S. Well Services, Inc. files suit against Halliburton Company and Cimarex Energy Co. for patent infringement, Apr. 15, 2021, PR Newswire, https://www.prnewswire.com/news-releases/us-well-services-inc-files-suit-against-halliburton-company-and-cimarex-energy-co-for-patent-infringement-301270118.html, 2 pages.
Publications, U.S. Department of Labor—Occupational Safety and Health Administration, https://web.archive.org/web/20150626140537/https://www.osha.gov/pls/publications/publication.html, 47 pages.
OSHA Publications, U.S. Department of Labor—Occupational Safety and Health Administration, https://web.archive.org/web/20150406054914/https://www.osha.gov/pls/publications/publication.AthruZ?pType=Industry, Jun. 13, 2021, 3 pages.
U.S. Department of Labor—Occupational Safety and Health Administration, https://web.archive.org/web/20150406152927/https://www.osha.gov/, 4 pages.
Steven C. Carlson, Weaponizing IPRs, Landslide, Sep. 22, 2019, 10 pages.
Declaration of Dr. Mark Ehsani, IPR2021-01066, Jul. 2, 2021, 213 pages.
Declaration of Robert Schaaf, IPR2021-01066, Nov. 17, 2021, 43 pages.
U.S. Pat. No. 10,020,711, 250 pages.
U.S. Appl. No. 62/323,303, 62 pages.
Amazon.com purchase page for Electrical Engineering Reference Manual for the Electrical and Computer PE Exam, Sixth Edition, https://web.archive.org/web/20070103124447/https:/www.amazon.com/Electrical-Engineering-Reference-Manual-Computer/dp/1888577568/, accessed Jul. 23, 2021, 7 pages.
Public Catalog of the U.S. Copyright Office for search result: electrical engineering reference manual, https://cocatalog.loc.gov/cgi-bin/Pwebrecon.cgi?v1=6&ti=1, 6&Search_Arg=electrical engi-

(56) References Cited

OTHER PUBLICATIONS neering reference manual&Search_Code=TALL&CNT=25&PI . . . , accessed Jul. 21, 2021, 2 pages.
Declaration of Robert Schaaf, IPR2021-01238, Nov. 17, 2021, 38 pages.
John A. Camera, PE, Electrical Engineering Reference Manual for the Electrical and Computer PE Exam, Sixth Edition, 2002, 102 pages.
U.S. Pat. No. 10,526,882, 845 pages.
U.S. Appl. No. 62/180,289, 32 pages.
IEEE 100 The Authoritative Dictionary of IEEE Standards Terms Seventh Edition, 2000, 7 pages.
National Electrical Manufacturers Association, Nema ICS 61800-4 Adjustable Speed Electrical Power Drive Systems, Part 4: General Requirements—Rating Specifications for A.C. Power Drive Systems above 1000 V a.c. and Not Exceeding 35 kV, 2004 22 pages.
Professional Publications, Inc., FE Exam, PE Exam, ARE Exam, and NCIDQ Exam Review / Professional Engineering Licensing, About PPI, https://web.archive.org/web/20031219231426/http://ppi2pass.com:80/catalog/servlet/MyPpi_pg_aboutppi.html, accessed Jul. 22, 2021, 1 page.
Professional Publications, Inc., FE Exam, PE Exam, ARE Exam, and NCIDQ Exam Review / Professional Engineering Licensing, What PPI Customers Say, https://web.archive.org/web/20031226130924/http://ppi2pass.com:80/catalog/servlet/MyPpi_pg_comments-EEcomments.html, accessed Jul. 22, 2021, 2 pages.
Professional Publications, Inc., FE Exam, PE Exam, ARE Exam, and NCIDQ Exam Review / Professional Engineering Licensing, Homepage, https://web.archive.org/web/20040209054901/http://ppi2pass.com:80/catalog/servlet/MyPpi, accessed Jul. 19, 2021, 1 page.
Professional Publications, Inc., FE Exam, PE Exam, ARE Exam, and NCIDQ Exam Review / Professional Engineering Licensing, The PPI Online Catalog, https://web.archive.org/web/20040215142016/http://ppi2pass.com:80/catalog/servlet/MyPpi_ct_MAIN, accessed Jul. 19, 2021, 2 pages.
Professional Publications, Inc., FE Exam, PE Exam, ARE Exam, and NCIDQ Exam Review / Professional Engineering Licensing, Electrical PE Exam Review Products, https://web.archive.org/web/20040214233851/http://ppi2pass.com:80/catalog/servlet/MyPpi_ct_ELECTRICAL, accessed Jul. 19, 2021, 7 pages.
Professional Publications, Inc., FE Exam, PE Exam, ARE Exam, and NCIDQ Exam Review / Professional Engineering Licensing, Instructor's Corner, https://web.archive.org/web/20031219232547/http://ppi2pass.com:80/catalog/servlet/MyPpi_pg_corner-corner.html, accessed Jul. 19, 2021, 2 pages.
Professional Publications, Inc., FE Exam, PE Exam, ARE Exam, and NCIDQ Exam Review / Professional Engineering Licensing, Teaching an Electrical and Computer Engineering PE Exam Review Course, https://web.archive.org/web/20031223100101/http://ppi2pass.com:80/catalog/servlet/MyPpi_pg_corner-teachee.html, accessed Jul. 19, 2021, 2 pages.
Professional Publications, Inc., Electrical Engineering Reference Manual, 12 pages.
Professional Publications, Inc., Books for the FE, PE, FLS and PLS Exams, Spring 2004, http://www.ppi2pass.com/corner/catalog.pdf, 16 pages.
Lionel B. Roe, Practices and Procedures of Industrial Electrical Design, 1972, McGraw-Hill, Inc., Chapter 2: The Basic Electric System, 11 pages.
Declaration of Duncan Hall, Jul. 23, 2021, https://web.archive.org/web/20031219231426/http://ppi2pass.com:80/catalog/servlet/MyPpi_pg_aboutppi.html, 12 pages.
Declaration of Robert Durham, IPR2021-01315, Aug. 12, 2021, 209 pages.
Declaration of Robert Schaaf, IPR2021-01315, Nov. 19, 2021, 39 pages.
U.S. Pat. No. 9,893,500,106 pages.
U.S. Pat. No. 9,893,500, 291 pages.
U.S. Appl. No. 62/323,168, 41 pages.
*U.S. Well Services, Inc. and U.S. Well Services, LLC* v *Halliburton Company and Cimarex Energy Co.*, Case No. 6:21-cv-00367-ADA, Document 63, Defendants' Claim Construction Brief in Reply to U.S. Well Services, LLC's Responsive Brief, Dec. 2, 2021, 30 pages.
*U.S. Well Services, Inc.* v *Halliburton Company*, Case No. 6:21-cv-00367-ADA, Civil Docket, accessed Dec. 17, 2021, 14 pages.
*U.S. Well Services, Inc.* v *Halliburton Company*, Case No. 6:21-cv-00367-ADA, Document 64, Order Resetting Markman Hearing, Dec. 8, 2021, 1 page.
Approved American National Standard, ANSI/NEMA MG Jan. 2011, American National Standard Motors and Generators, Dec. 9, 2021, 636 pages.
Comprehensive Power: Power it Up, Feb. 27, 2013, 28 pages.
Comprehensive Power: Power it Up, Brochure, 26 pages.
Declaration of Robert Schaaf, IPR2021-01316, Nov. 19, 2021, 33 pages.
Declaration of Robert Durham, IPR2021-01316, Aug. 13, 2021, 75 pages.
U.S. Pat. No. 10,280,724, 668 pages.
Declaration of Robert Schaaf, IPR2021-01538, Dec. 28, 2021, 40 pages.
Declaration of Dr. L. Brun Hilbert, Jr., P.E., IPR2021-01538, Sep. 22, 2021, 99 pages.
U.S. Pat. No. 10,408,031, 734 pages.
Maxwell James Clerk 1868, On Governors, Proc. R. Soc. Lond., pp. 16270-283.
Katsuhiko Ogata, Modern Control Engineering: Third Edition, 1997, 2 pages.
49 C.F.R. Part 393 (Oct. 1, 2006), 36 pages.
Kroposki et al., Making Microgrids Work, 6 IEEE Power and Energy Mag. 40, 41 (2008).
Dan T. Ton & Merrill A. Smith, The U.S. Department of Energy's Microgrid Initiative, 25 The Electricity J. 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.
Non-Final Office Action issued in U.S. Appl. No. 16/871,928 dated Aug. 25, 2021.
Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.

\* cited by examiner

SYSTEM AND METHOD FOR PARALLEL POWER AND BLACKOUT PROTECTION FOR ELECTRIC POWERED HYDRAULIC FRACTURING

CROSS-REFERENCE TO RELATED PATENT APPLICATIONS

This application is a continuation-in-part of non-provisional U.S. patent application Ser. No. 13/679,689, filed Nov. 16, 2012, and claims priority to U.S. Provisional Patent Appln. No. 62/063,680, filed Oct. 14, 2015, the full disclosures of which are hereby incorporated herein by reference.

BACKGROUND OF THE INVENTION

1. Field of the Invention

This technology relates to hydraulic fracturing in oil and gas wells. In particular, this technology relates to methods of powering electric hydraulic fracturing spreads.

2. Brief Description of Related Art

Typically, most equipment, including pumps used in hydraulic fracturing operations, are diesel powered, with each pump powered by a discrete diesel engine. If one pump goes out, the remaining pumps are unaffected, so that circulation in the well can be maintained by the still-functioning pumps.

Some sites, however, utilize electric power to drive the pumps. In some such systems, the entire power supply may be routed through a single switchgear point. In such a system, all of the turbine generators are synced and tied together, which leads limited redundancy and blackout protection. In practice, this means that if one of the turbines loses power, there will not be sufficient remaining power to continue pumping operations. Thus, the entire system could cease to function, with negative consequences (e.g., a screen out) for the well. In addition, even in systems where enough turbines remain serviceable to continue pumping the well to avoid a screen out, this function is not performed because the ability to shed load, such as by shutting down power to non-critical parts of the system, is limited. The power draw from all of the units overloads the turbines causing a shutdown of the entire system.

SUMMARY OF THE INVENTION

One embodiment of the present technology provides a system for powering equipment used in a hydraulic fracturing operation. The system includes at least one first generator in electrical communication with a first switchgear for providing power to primary components of a hydraulic fracturing operation, and at least one second generator in electrical communication with a second switchgear for providing power to backup components of a hydraulic fracturing operation. The at least one first generator is independent of the at least one second generator so that if the at least one first generator loses the ability to generate electricity, the at least one second generator can continue to generate electricity.

In some embodiments, the system can include a load shedding system for monitoring turbine generator overload. The load shedding system can have a load shed signal line that detects when a power draw will overload the system, and can be capable of shutting down electric power to a portion of the system to prevent an overload of the system. In some example embodiments, the load shedding system can include a breaker, and can be configured to send a signal to open the breaker to cut power to at least one of the primary or backup components.

In certain embodiments, the primary and secondary components can be selected from the group consisting of a pump, a data van, sand equipment, a blender, and a hydration unit. In addition, the load shed signal line can carry a signal of 4-20 mA to the breaker. Furthermore, the first and second switchgear can channel electrical power from the at least one first generator and the at least one second generator, respectively, to at least one transformer and/or to an auxiliary transformer. The at least one transformer can be connected to at least one pump, and the auxiliary transformer can be connected to auxiliary equipment selected from the group consisting of a data van, sand equipment, a blender, and a hydration unit.

Another embodiment of the present technology provides a system for preventing failure in a hydraulic fracturing system that includes at least one generator for transmitting power to a plurality of components of a hydraulic fracturing system, a load shedding system for monitoring power draw of the plurality of components, the load shedding system including a load shed signal line, and a breaker configured for activation by the load shed signal line to cut power to one or more of the plurality of components if the one or more of the plurality of components draws more than a predetermined acceptable amount of power to prevent overload of the system. In some embodiments, the plurality of components can be selected from the group consisting of a pump, a data van, sand equipment, a blender, and a hydration unit. In addition, the load shed signal line can carry a signal of 4-20 mA to the breaker.

Yet another embodiment of the present technology provides a method for preventing failure of an electric powered hydraulic fracturing system. The method includes the steps of powering a plurality of primary components of a hydraulic fracturing operation by a first generator in electrical communication with the primary components through a first switchgear. The method further includes electrically connecting a plurality of backup components of a hydraulic fracturing operation to a second generator through a second switchgear, and powering one or more of the plurality of backup components in lieu of one or more of the plurality of primary components in the event that power to the one or more of the plurality of primary components is lost. In some embodiments, the method can also include the steps of determining when a power draw will overload one or more of the plurality of primary components in the hydraulic fracturing system, and sending a load signal to a breaker to cut power to the one or more of the plurality of primary components to prevent overloading of the hydraulic fracturing system.

BRIEF DESCRIPTION OF THE DRAWINGS

The present technology will be better understood on reading the following detailed description of nonlimiting embodiments thereof, and on examining the accompanying drawing, in which.

DETAILED DESCRIPTION OF THE PREFERRED EMBODIMENT

Figure 1:
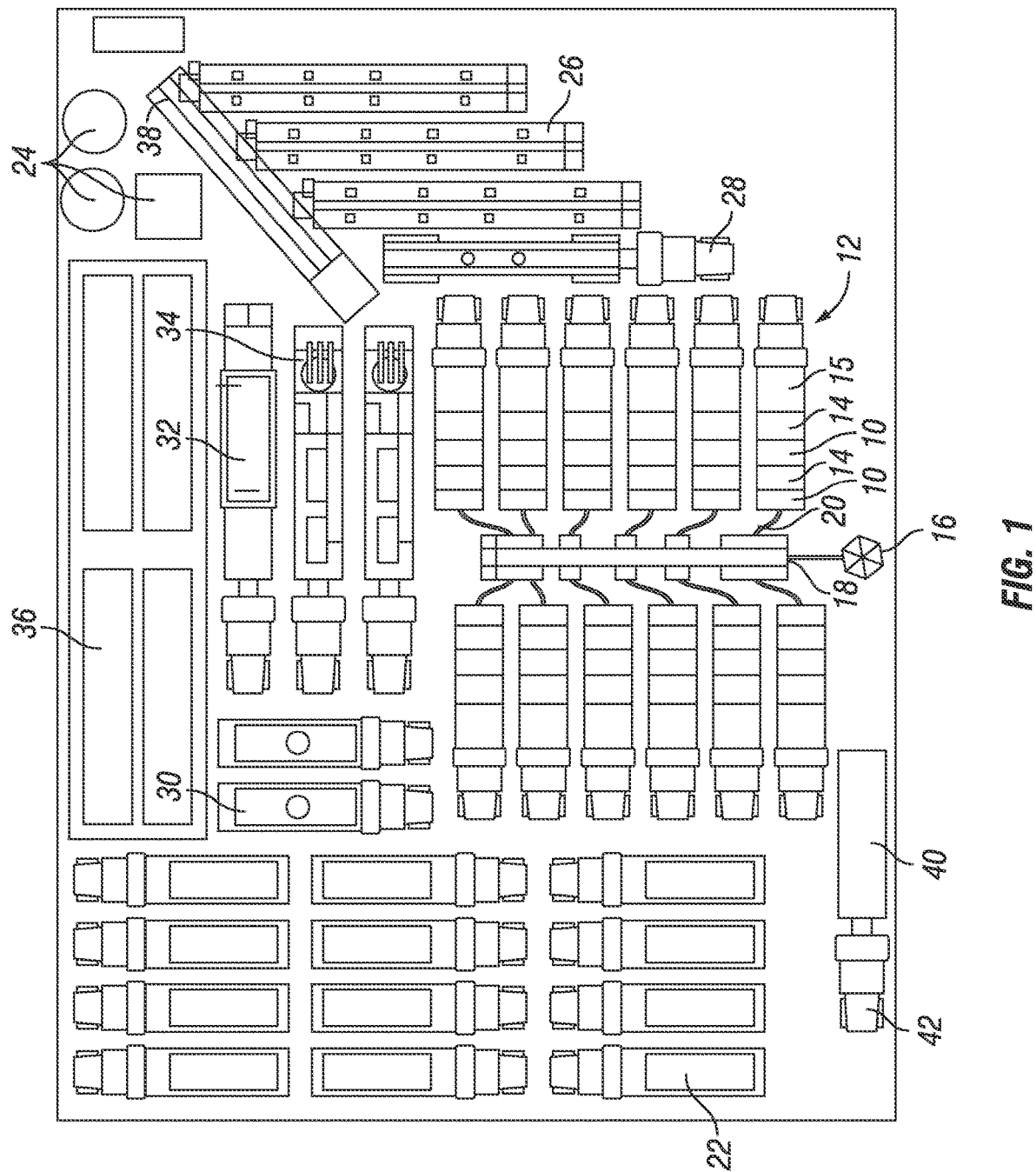
FIG. 1 is a schematic plan view of equipment used in a hydraulic fracturing operation, according to an embodiment of the present technology.

The foregoing aspects, features, and advantages of the present technology will be further appreciated when considered with reference to the following description of preferred embodiments and accompanying drawing, wherein like reference numerals represent like elements. In describing the preferred embodiments of the technology illustrated in the appended drawing, specific terminology will be used for the sake of clarity. However, the technology is not intended to be limited to the specific terms used, and it is to be understood that each specific term includes equivalents that operate in a similar manner to accomplish a similar purpose.

Figure 3:
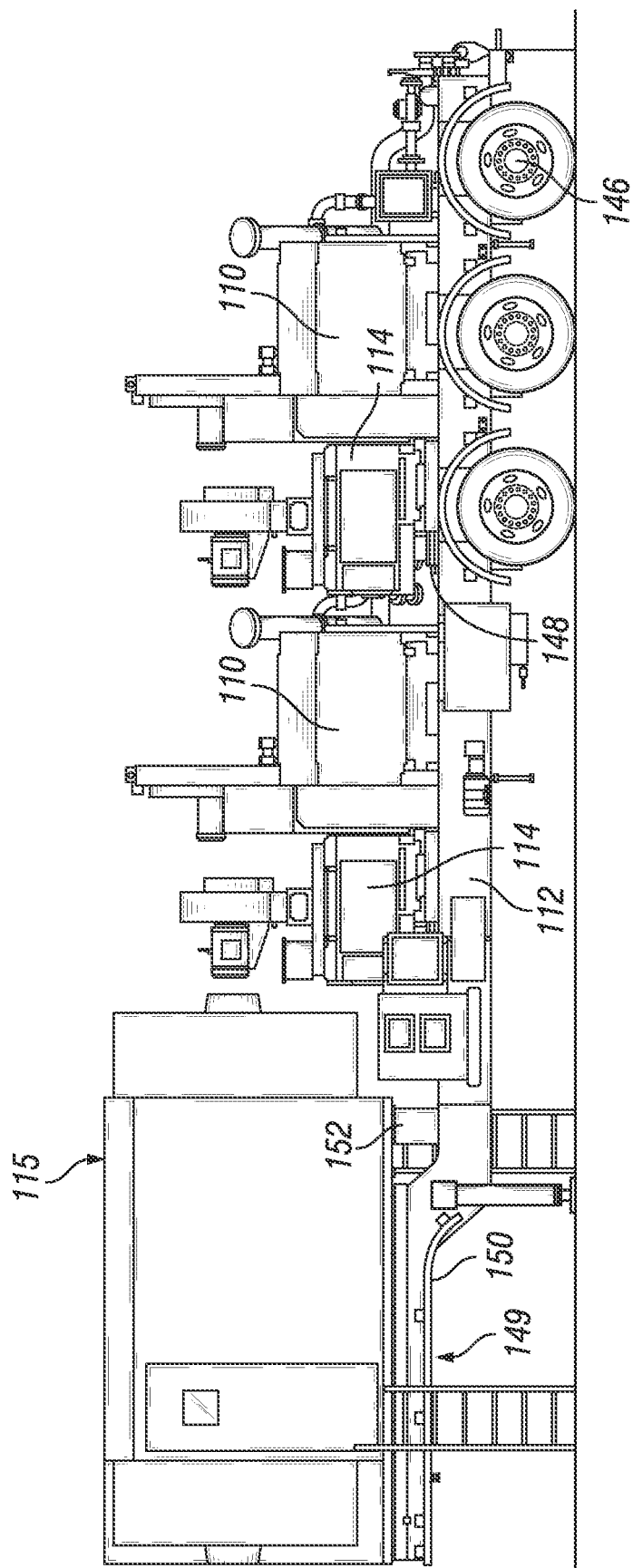
FIG. 3 is a left side view of equipment used to pump fracturing fluid into a well and mounted on a trailer, according to an embodiment of the present technology.
Figure 4:
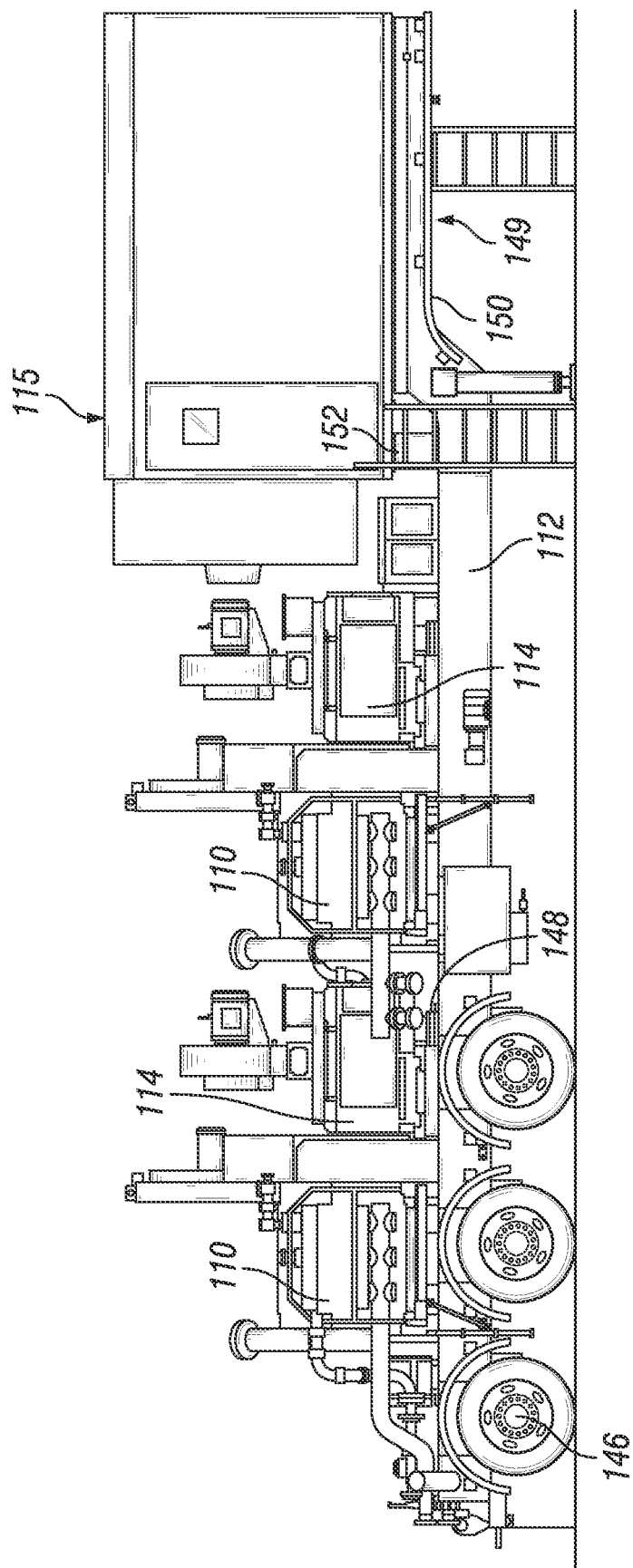
FIG. 4 is a right side view of the equipment and trailer shown in FIG. 3.

FIG. 1 shows a plan view of equipment used in a hydraulic fracturing operation. Specifically, there is shown a plurality of pumps 10 mounted to vehicles 12, such as trailers (as shown, for example, in FIGS. 3 and 4). In the embodiment shown, the pumps 10 are powered by electric motors 14, which can also be mounted to the vehicles 12. The pumps 10 are fluidly connected to the wellhead 16 via the missile 18 (although in some embodiments, high pressure piping or hose can be used in place of the missile). As shown, the vehicles 12 can be positioned near enough to the missile 18 to connect fracturing fluid lines 20 between the pumps 10 and the missile 18. The missile 18 is then connected to the wellhead 16 and configured to deliver fracturing fluid provided by the pumps 10 to the wellhead 16. Although the vehicles 12 are shown in FIGS. 3 and 4 to be trailers, the vehicles could alternately be trucks, wherein the pumps 10, motors 14, and other equipment are mounted directly to the truck.

In some embodiments, each electric motor 14 can be an induction motor, and can be capable of delivering about 1500 horsepower (HP), 1750 HP, or more. Use of induction motors, and in particular three-phase induction motors, allows for increased power output compared to other types of electric motors, such as permanent magnet (PM) motors. This is because three-phase induction motors have nine poles (3 poles per phase) to boost the power factor of the motors. Conversely, PM motors are synchronous machines that are accordingly limited in speed and torque. This means that for a PM motor to match the power output of a three-phase induction motor, the PM motor must rotate very fast, which can lead to overheating and other problems.

Each pump 10 can optionally be rated for about 2250 horsepower (HP) or more. In addition, the components of the system, including the pumps 10 and the electric motors 14, can be capable of operating during prolonged pumping operations, and in temperature in a range of about −20 degrees C. or less to about 55 degrees C. or more. In addition, each electric motor 14 can be equipped with a variable frequency drive (VFD) 15, and an A/C console, that controls the speed of the electric motor 14, and hence the speed of the pump 10.

The VFDs 15 of the present technology can be discrete to each vehicle 12 and/or pump 10. Such a feature is advantageous because it allows for independent control of the pumps 10 and motors 14. Thus, if one pump 10 and/or motor 14 becomes incapacitated, the remaining pumps 10 and motors 14 on the vehicle 12 or in the fleet can continue to function, thereby adding redundancy and flexibility to the system. In addition, separate control of each pump 10 and/or motor 14 makes the system more scalable, because individual pumps 10 and/or motors 14 can be added to or removed from a site without modification to the VFDs 15.

The electric motors 14 of the present technology can be designed to withstand an oilfield environment. Specifically, some pumps 10 can have a maximum continuous power output of about 1500 HP, 1750 HP, or more, and a maximum continuous torque of about 8750 ft-lb, 11,485 ft-lb, or more. Furthermore, electric motors 14 of the present technology can include class H insulation and high temperature ratings, such as about 1100 degrees C. or more. In some embodiments, the electric motor 14 can include a single shaft extension and hub for high tension radial loads, and a high strength 4340 alloy steel drive shaft, although other suitable materials can also be used.

The VFD 15 can be designed to maximize the flexibility, robustness, serviceability, and reliability required by oilfield applications, such as hydraulic fracturing. For example, as far as hardware is concerned, the VFD 15 can include packaging receiving a high rating by the National Electrical Manufacturers Association (such as nema 1 packaging), and power semiconductor heat sinks having one or more thermal sensors monitored by a microprocessor to prevent semiconductor damage caused by excessive heat. Furthermore, with respect to control capabilities, the VFD 15 can provide complete monitoring and protection of drive internal operations while communicating with an operator via one or more user interfaces. For example, motor diagnostics can be performed frequently (e.g., on the application of power, or with each start), to prevent damage to a grounded or shorted electric motor 14. The electric motor diagnostics can be disabled, if desired, when using, for example, a low impedance or high-speed electric motor.

In some embodiments, the pump 10 can optionally be a 2250 HP triplex or quintuplex pump. The pump 10 can optionally be equipped with 4.5 inch diameter plungers that have an eight (8) inch stroke, although other size plungers or stroke lengths can be used, depending on the preference of the operator. The pump 10 can further include additional features to increase its capacity, durability, and robustness, including, for example, a 6.353 to 1 gear reduction, autofrettaged steel or steel alloy fluid end, wing guided slush type valves, and rubber spring loaded packing Alternately, pumps having slightly different specifications could be used. For example, the pump 10 could be equipped with 4 inch diameter plungers, and/or plungers having a ten (10) inch stroke.

In addition to the above, certain embodiments of the present technology can optionally include a skid (not shown) for supporting some or all of the above-described equipment. For example, the skid can support the electric motor 14 and the pump 10. In addition, the skid can support the VFD 15. Structurally, the skid can be constructed of heavy-duty longitudinal beams and cross-members made of an appropriate material, such as, for example, steel. The skid can further include heavy-duty lifting lugs, or eyes, that can optionally be of sufficient strength to allow the skid to be lifted at a single lift point. It is to be understood, however, that a skid is not necessary for use and operation of the technology, and the mounting of the equipment directly to a vehicle 12 without a skid can be advantageous because it enables quick transport of the equipment from place to place, and increased mobility of the pumping system.

Referring back to FIG. 1, also included in the equipment is a plurality of electric generators 22 that are connected to, and provide power to, the electric motors 14 on the vehicles 12. To accomplish this, the electric generators 22 can be connected to the electric motors 14 by power lines (not shown). The electric generators 22 can be connected to the electric motors 14 via power distribution panels (not shown). In certain embodiments, the electric generators 22 can be powered by natural gas. For example, the generators can be powered by liquefied natural gas. The liquefied natural gas can be converted into a gaseous form in a vaporizer prior to use in the generators. The use of natural gas to power the electric generators 22 can be advantageous because the units can run off of a pipeline supply to simplify fuel delivery and increase safety. Other embodiments allow use of natural gas stored in above ground natural gas vessels 24 already in place on site in a field that produces gas in sufficient quantities. Thus, a portion of this natural gas can be used to power the electric generators 22, thereby reducing or eliminating the need to import fuel from offsite. If desired by an operator, the electric generators 22 can optionally be natural gas turbine generators, such as those shown in FIG. 2. The generators can run on any appropriate type of fuel, including liquefied natural gas (LNG), compressed natural gas (CNG), diesel fuel, or a combination of these fuels.

FIG. 1 also shows equipment for transporting and combining the components of the hydraulic fracturing fluid used in the system of the present technology. In many wells, the fracturing fluid contains a mixture of water, sand or other proppant, acid, and other chemicals. Examples of fracturing fluid components include acid, anti-bacterial agents, clay stabilizers, corrosion inhibitors, friction reducers, gelling agents, iron control agents, pH adjusting agents, scale inhibitors, and surfactants. Historically, diesel has at times been used as a substitute for water in cold environments, or where a formation to be fractured is water sensitive, such as, for example, clay. The use of diesel, however, has been phased out over time because of price, and the development of newer, better technologies.

In FIG. 1, there are specifically shown sand transporting vehicles 26, an acid transporting vehicle 28, vehicles for transporting other chemicals 30, and a vehicle carrying a hydration unit 32. Also shown are fracturing fluid blenders 34, which can be configured to mix and blend the components of the hydraulic fracturing fluid, and to supply the hydraulic fracturing fluid to the pumps 10. In the case of liquid components, such as water, acids, and at least some chemicals, the components can be supplied to the blenders 34 via fluid lines (not shown) from the respective component vehicles, or from the hydration unit 32. In the case of solid components, such as sand, the component can be delivered to the blender 34 by a conveyor belt 38. The water can be supplied to the hydration unit 32 from, for example, water tanks 36 onsite. Alternately, the water can be provided by water trucks. Furthermore, water can be provided directly from the water tanks 36 or water trucks to the blender 34, without first passing through the hydration unit 32.

In certain embodiments of the technology, the hydration units 32 and blenders 34 can be powered by electric motors. For example, the blenders 34 can be powered by more than one motor, including motors having 600 horsepower or more, and motors having 1150 horsepower or more. The hydration units 32 can be powered by electric motors of 600 horsepower or more. In addition, in some embodiments, the hydration units 32 can each have up to five (5) chemical additive pumps or more, and a 200 bbl steel hydration tank.

Pump control and data monitoring equipment 40 can be mounted on a control vehicle 42, and connected to the pumps 10, electric motors 14, blenders 34, and other downhole sensors and tools (not shown) to provide information to an operator, and to allow the operator to control different parameters of the fracturing operation. For example, the pump control and data monitoring equipment 40 can include an A/C console that controls the VFD 15, and thus the speed of the electric motor 14 and the pump 10. Other pump control and data monitoring equipment can include pump throttles, a VFD fault indicator with a reset, a general fault indicator with a reset, a main estop, a programmable logic controller for local control, and a graphics panel. The graphics panel can include, for example, a touchscreen interface.

Figure 2:
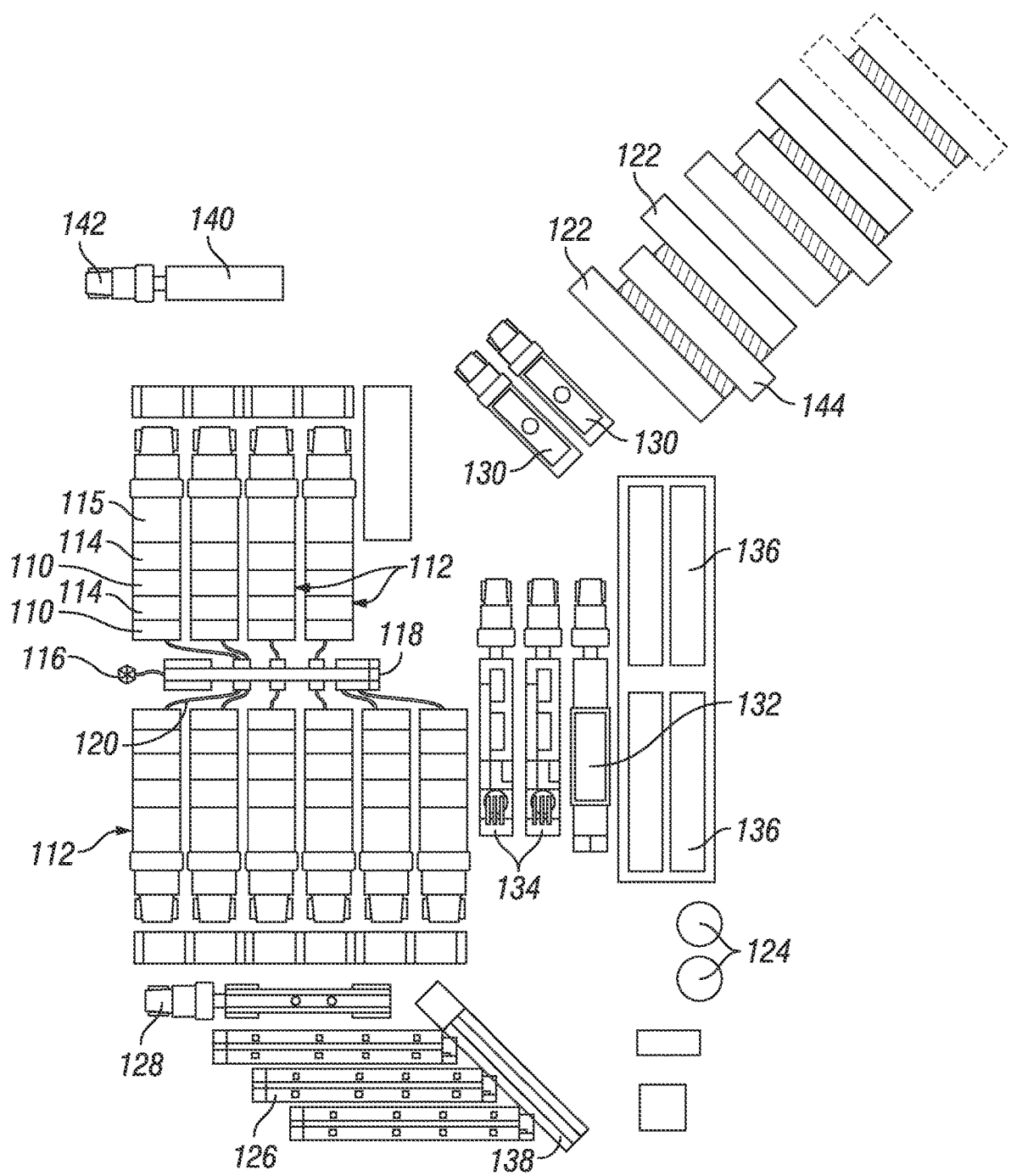
FIG. 2 is a schematic plan view of equipment used in a hydraulic fracturing operation, according to an alternate embodiment of the present technology.

Referring now to FIG. 2, there is shown an alternate embodiment of the present technology. Specifically, there is shown a plurality of pumps 110 which, in this embodiment, are mounted to pump trailers 112. As shown, the pumps 110 can optionally be loaded two to a trailer 112, thereby minimizing the number of trailers needed to place the requisite number of pumps at a site. The ability to load two pumps 110 on one trailer 112 is possible because of the relatively light weight of the electric powered pumps 110 compared to other known pumps, such as diesel pumps. This is specifically due to the removal of the diesel engine and transmission. In the embodiment shown, the pumps 110 are powered by electric motors 114, which can also be mounted to the pump trailers 112. Furthermore, each electric motor 114 can be equipped with a VFD 115, and an A/C console, that controls the speed of the motor 114, and hence the speed of the pumps 110.

The VFDs 115 shown in FIG. 2 can be discrete to each pump trailer 112 and/or pump 110. Such a feature is advantageous because it allows for independent control of the pumps 110 and motors 114. Thus, if one pump 110 and/or motor 114 becomes incapacitated, the remaining pumps 110 and motors 114 on the pump trailers 112 or in the fleet can continue to function, thereby adding redundancy and flexibility to the system. In addition, separate control of each pump 110 and/or motor 114 makes the system more scalable, because individual pumps 110 and/or motors 114 can be added to or removed from a site without modification to the VFDs 115.

In addition to the above, and still referring to FIG. 2, the system can optionally include a skid (not shown) for supporting some or all of the above-described equipment. For example, the skid can support the electric motors 114 and the pumps 110. In addition, the skid can support the VFD 115. Structurally, the skid can be constructed of heavy-duty longitudinal beams and cross-members made of an appropriate material, such as, for example, steel. The skid can further include heavy-duty lifting lugs, or eyes, that can optionally be of sufficient strength to allow the skid to be lifted at a single lift point. It is to be understood that a skid is not necessary for use and operation of the technology and the mounting of the equipment directly to a trailer 112 may be advantageous because if enables quick transport of the equipment from place to place, and increased mobility of the pumping system, as discussed above.

The pumps 110 are fluidly connected to a wellhead 116 via a missile 118. As shown, the pump trailers 112 can be positioned near enough to the missile 118 to connect fracturing fluid lines 120 between the pumps 110 and the missile 118. The missile 118, or other fluid connection device, such as high pressure piping or hose, is then connected to the wellhead 116 and configured to deliver fracturing fluid provided by the pumps 110 to the wellhead 116.

This embodiment also includes a plurality of turbine generators 122 that are connected to, and provide power to, the electric motors 114 on the pump trailers 112. To accomplish this, the turbine generators 122 can be connected to the electric motors 114 by power lines (not shown). The turbine generators 122 can be connected to the electric motors 114 via power distribution panels (not shown). In certain embodiments, the turbine generators 122 can be powered by natural gas, similar to the electric generators 22 discussed above in reference to the embodiment of FIG. 1. Also included are control units 144 for the turbine generators 122. The control units 144 can be connected to the turbine generators 122 in such a way that each turbine generator 122 is separately controlled. This provides redundancy and flexibility to the system, so that if one turbine generator 122 is taken off line (e.g., for repair or maintenance), the other turbine generators 122 can continue to function.

The embodiment of FIG. 2 can include other equipment similar to that discussed above. For example, FIG. 2 shows sand transporting vehicles 126, acid transporting vehicles 128, other chemical transporting vehicles 130, hydration unit 132, blenders 134, water tanks 136, conveyor belts 138, and pump control and data monitoring equipment 140 mounted on a control vehicle 142. The function and specifications of each of these is similar to corresponding elements shown in FIG. 1.

Use of pumps 10, 110 powered by electric motors 14, 114 and natural gas powered electric generators 22 (or turbine generators 122) to pump fracturing fluid into a well is advantageous over known systems for many different reasons. For example, the equipment (e.g. pumps, electric motors, and generators) is lighter than the diesel pumps commonly used in the industry. The lighter weight of the equipment allows loading of the equipment directly onto a truck body or trailer. Where the equipment is attached to a skid, as described above, the skid itself can be lifted on the truck body, along with all the equipment attached to the skid. Furthermore, and as shown in FIGS. 3 and 4, trailers 112 can be used to transport the pumps 110 and electric motors 114, with two or more pumps 110 carried on a single trailer 112. Thus, the same number of pumps 110 can be transported on fewer trailers 112. Known diesel pumps, in contrast, cannot be transported directly on a truck body or two on a trailer, but must be transported individually on trailers because of the great weight of the engine and transmissions that are replaced by a motor.

The ability to transfer the equipment of the present technology directly on a truck body or two to a trailer increases efficiency and lowers cost. In addition, by eliminating or reducing the number of trailers to carry the equipment, the equipment can be delivered to sites having a restricted amount of space, and can be carried to and away from worksites with less damage to the surrounding environment. Another reason that the electric powered pump system of the present technology is advantageous is that it runs on natural gas. Thus, the fuel is lower cost, the components of the system require less maintenance, and emissions are lower, so that potentially negative impacts on the environment are reduced.

More detailed side views of the trailers 112, having various system components mounted thereon, are shown in FIGS. 3 and 4, which show left and right side views of a trailer 112, respectively. As can be seen, the trailer 112 can be configured to carry pumps 110, electric motors 114 and a VFD 115. Thus configured, the motors 114 and pumps 110 can be operated and controlled while mounted to the trailers 112. This provides advantages such as increased mobility of the system. For example, if the equipment needs to be moved to a different site, or to a repair facility, the trailer can simply be towed to the new site or facility without the need to first load the equipment onto a trailer or truck, which can be a difficult and hazardous endeavor. This is a clear benefit over other systems, wherein motors and pumps are attached to skids that are delivered to a site and placed on the ground.

In order to provide a system wherein the pumps 110, motors 114, and VFDs 115 remain trailer mounted, certain improvements can be made to the trailers 112. For example, a third axle 146 can be added to increase the load capacity of the trailer and add stability. Additional supports and cross members 148 can be added to support the motors' torque. In addition, the neck 149 of the trailer can be modified by adding an outer rib 150 to further strengthen the neck 149. The trailer can also include specially designed mounts 152 for the VFD 115 that allow the trailer to move independently of the VFD 115, as well as specially designed cable trays for running cables on the trailer 112. Although the VFD 115 is shown attached to the trailer in the embodiment of FIGS. 3 and 4, it could alternately be located elsewhere on the site, and not mounted to the trailer 112.

In practice, a hydraulic fracturing operation can be carried out according to the following process. First, the water, sand, and other components are blended to form a fracturing fluid, which is pumped down the well by the electric-powered pumps. Typically, the well is designed so that the fracturing fluid can exit the wellbore at a desired location and pass into the surrounding formation. For example, in some embodiments the wellbore can have perforations that allow the fluid to pass from the wellbore into the formation. In other embodiments, the wellbore can include an openable sleeve, or the well can be open hole. The fracturing fluid can be pumped into the wellbore at a high enough pressure that the fracturing fluid cracks the formation, and enters into the cracks. Once inside the cracks, the sand, or other proppants in the mixture, wedges in the cracks, and holds the cracks open. In some embodiments, a fluid other than water can be used to the proppant.

Using the pump control and data monitoring equipment 40, 140 the operator can monitor, gauge, and manipulate parameters of the operation, such as pressures, and volumes of fluids and proppants entering and exiting the well. For example, the operator can increase or decrease the ratio of sand to water as the fracturing process progresses and circumstances change.

This process of injecting fracturing fluid into the wellbore can be carried out continuously, or repeated multiple times in stages, until the fracturing of the formation is optimized. Optionally, the wellbore can be temporarily plugged between each stage to maintain pressure, and increase fracturing in the formation. Generally, the proppant is inserted into the cracks formed in the formation by the fracturing, and left in place in the formation to prop open the cracks and allow oil or gas to flow into the wellbore.

Figure 5:
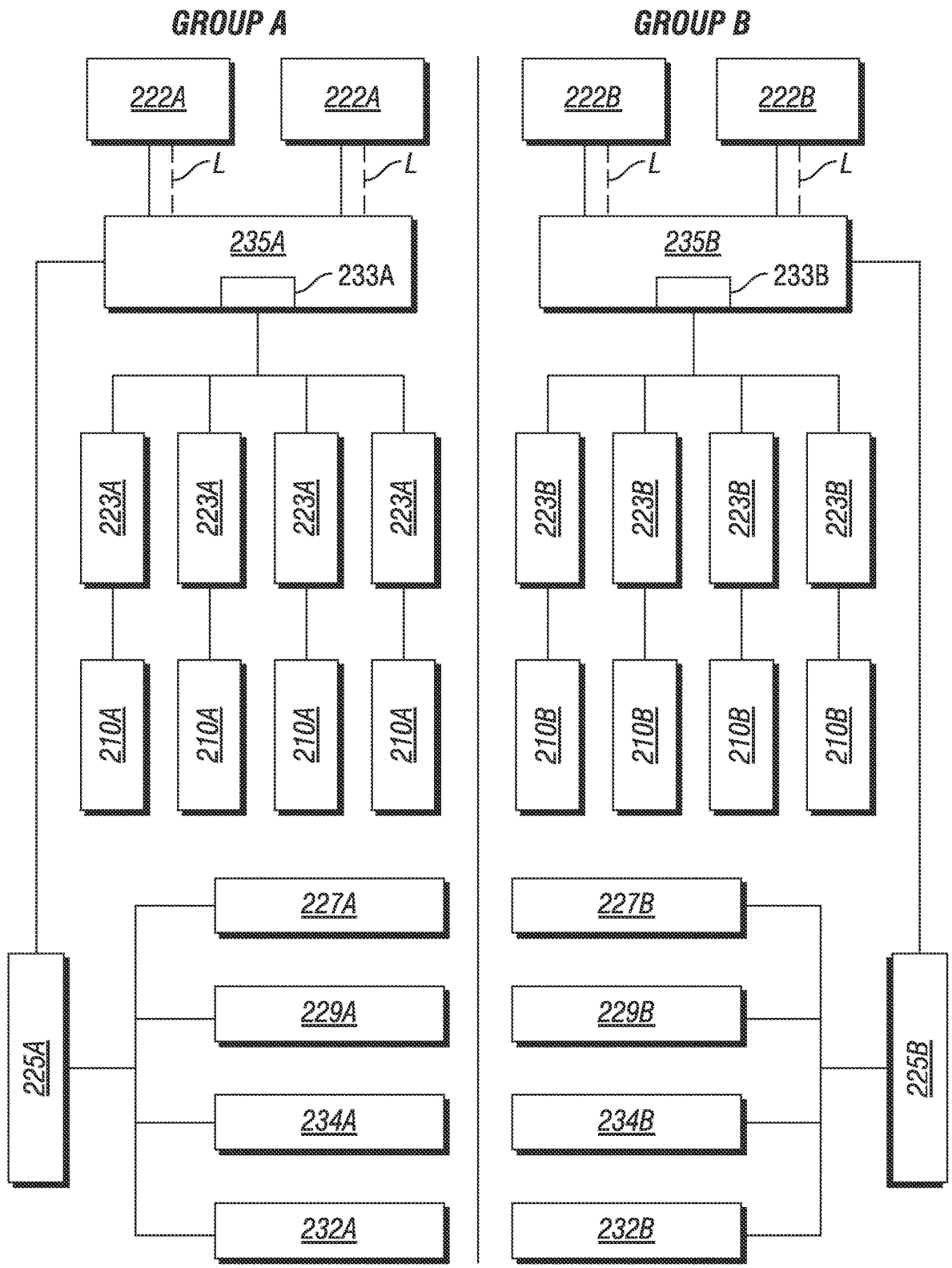
FIG. 5 is diagram showing how components of the equipment can be divided into independent systems according to an embodiment of the invention.

In FIG. 5 there is shown an embodiment of the invention wherein a plurality of generators 222A, 222B are divided into separate, parallel, and independent groups, including group A and group B. Each group A, B of generators 222A, 222B is connected in turn to separate and distinct groups of transformers 223A, 223B and pumps 210A, 210B, as well as separate and distinct auxiliary trailers 225A, 225B, each including its own ancillary equipment, such as, for example, data vans 227A, 227B, sand equipment 229A, 229B, blenders 234A, 234B, and hydration units 232A, 232B. Although FIG. 5 shows more than one generator 222A, 222B in each group A, B, it is possible that any individual group could include a single generator 222A, 222B. Furthermore, although not shown in FIG. 5, multiple gas compressors can be utilized to supply fuel to the generators 222A, 222B so that there is redundancy in the gas compression portion of the system as well.

The advantages provided by the arrangement shown in FIG. 5 are many. For example, the use of separate independent power sources adds a layer of protection by helping to prevent the complete loss of power of the hydraulic fracturing system. This is accomplished by eliminating any single point electric power generation and distribution failure points. This means that if power is lost in one group A, B, then the other group(s) A, B will continue to operate. In practice, this could be beneficial, for example, where power is lost to some of the generators 222A, so that normal pumping operations must cease. In such a scenario, the remaining generators 222B could continue to power a sufficient number of pumps 223B to pump and flush the well, thereby avoiding an expensive screen out that would require a drilling rig to come in and service the well.

In addition, the arrangement of FIG. 5 provides the ability to load shed, as indicated by the load shed signal lines L. Load shedding is the deliberate shutdown of electric power in parts of a system to prevent the failure of the entire system when demand strains the capacity of the system. The load shed system of the embodiment of FIG. 5 can monitor when power draw will overload the system (i.e., when demand is higher than supply), and it will send a signal to open a breaker 233A, 233B to cut certain pumps 210A, 210B, thereby reducing power before the entire bank is overloaded. Thus, the system can actively prevent a blackout of the entire fracturing system by incorporating load shed into the system.

These two advantages (i.e., the provision of independent groups of generators 222A, 222B and load shedding) are made possible by certain features of the embodiment of FIG. 5, including the provision of two or more generators 222A, 222B grouped into two or more banks of power, which are kept separate to create redundancy and backup capabilities in the system. In addition, the load shed technology can monitor when the generators 222A, 222B will overload, and, in response, can send a signal to open a breaker 233A, 233B to cut power to individual pumps 210A, 210B, thereby preventing overload of the entire bank. In this regard, power may be cut to a pump 210A, 210B by sending, for example, a 4-20 mA (or other) signal to open a breaker 233A, 233B.

Furthermore, there can be provided both primary and secondary equipment related to other parts of the fracturing system. For example, there can be a primary blender 234A and a backup blender 234B, as well as primary and backup data vans 227A, 227B, sand equipment 229A, 229B, and hydration equipment 232A, 232B. The hydraulic fracturing pumps can be split evenly between the banks The primary equipment can be powered by one group A of generators 222A, and the secondary equipment can be powered by a secondary group B of generators 222B, thereby assuring that the equipment will function, even if one group A, B of generators 222A, 222B loses power.

As shown in the diagram of FIG. 5, one or more generators 222A can make up group A for power generation. The different generators 222A for group A are all phase synced together. The power from the generators 222A of group A goes to switchgear 235A. From switchgear 235A, the power goes to the transformers 223A, and to the auxiliary trailer 225A, which can have a transformer, as well as a VFD and softstarts for the blender and hydration units. Power can then go to one or more of the following: the primary blender 234A, the primary hydration unit 232A, the primary data van 227A, and/or the primary sand equipment 229A. Power from the transformers 223A also goes to pumps 210A.

Similarly, one or more generators can make up group B for separate power generation. The different generators 222B of group B are all phase synced together. The power from the generators 222B of group B goes to switchgear 235B. From switchgear 235B, the power goes to the transformers 223B, and from there to pumps 210B. Power also goes from switchgear 235B to an auxiliary trailer 225B, which can have a transformer, as well as a VFD and softstarts for the blender and hydration units. Power can then go to one or more of the following: the backup blender 234B, the backup hydration unit 232B, the backup data van 227B, and/or the backup sand equipment 229B.

The embodiment shown in FIG. 5 can be utilized with different types of units, including trailerized, skidded, and body loaded units. In addition, although two groups A, B are shown in FIG. 5, more than two groups can be used. Furthermore, different types of power generation can be used, such as diesel generators, and other types of generators. Moreover, the system could be backed up by a traditionally powered source. For example, a conventional diesel or bi-fuel powered frack system could be tied into the system as a backup, so that conventional means could be used to power the system if the electric system becomes incapacitated or ineffective. In such a scenario, a transfer switch could be used to switch a blender over to another bank, instead of having blenders rigged into different power supply banks While the technology has been shown or described in only some of its forms, it should be apparent to those skilled in the art that it is not so limited, but is susceptible to various changes without departing from the scope of the technology. Furthermore, it is to be understood that the above disclosed embodiments are merely illustrative of the principles and applications of the present technology. Accordingly, numerous modifications can be made to the illustrative embodiments and other arrangements can be devised without departing from the spirit and scope of the present technology as defined by the appended claims.

What is claimed is:

1. A system for powering equipment used in a hydraulic fracturing operation, the system comprising:
   at least one first generator in electrical communication with a first switchgear for providing power to primary components of a hydraulic fracturing operation;
   at least one second generator in electrical communication with a second switchgear for providing power to backup components of a hydraulic fracturing operation; and
   the at least one first generator being independent of the at least one second generator so that if the at least one first generator loses the ability to generate electricity, the at least one second generator can continue to generate electricity;
   wherein the first and second switchgear channel electrical power from the at least one first generator and the at least one second generator, respectively, to a transformer;
   wherein the first and second switchgear channel electrical power from the at least one first generator and the at least one second generator, respectively, to an auxiliary transformer; and wherein the auxiliary transformer is connected to at least one of a data van, send equipment, and/or a blender.

2. The system of claim 1, further comprising:
a load shedding system for monitoring generator overload, the load shedding system having a load shed signal line that detects when a power draw will overload the system, and capable of shutting down electric power to a portion of the system to prevent an overload of the system.

3. The system of claim 2, wherein the load shedding system includes a breaker, and is configured to send a signal to open the breaker to cut power to at least one of the primary or backup components.

4. The system of claim 1, wherein the primary and backup components are selected from the group consisting of a pump, a data van, sand equipment, a blender, and a hydration unit.

5. The system of claim 3, wherein the load shed signal line carries a signal of 4-20 mA to the breaker.

6. The system of claim 1, wherein the at least one transformer is connected to at least one pump.

7. A system for preventing failure in a hydraulic fracturing system, the system comprising:
a plurality of generators for transmitting power to a plurality of components of a hydraulic fracturing system, the plurality of generators in electrical communication with a plurality of switchgears;
a load shedding system for monitoring power draw of the plurality of components, the load shedding system including a load shed signal line; and
a breaker configured for activation by the load shed signal line to cut power to one or more of the plurality of components if the one or more of the plurality of components draws more than a predetermined acceptable amount of power to prevent overload of the system;
wherein the plurality of switchgears channel electrical power from the plurality of generators to a transformer
wherein the plurality of switchgears channel electrical power from the plurality of generators to an auxiliary transformer; and
wherein the auxiliary transformer is connected to at least one of a data van, sand equipment, and/or a blender.

8. The system of claim 7, wherein the plurality of components are selected from the group consisting of a pump, a data van, sand equipment, a blender, and a hydration unit.

9. The system of claim 7, wherein the load shed signal line carries a signal of 4-20 mA to the breaker.

* * * * *